United States Patent
Ekemark et al.

(10) Patent No.: US 9,820,188 B2
(45) Date of Patent: Nov. 14, 2017

(54) METHOD, SYSTEM AND DEVICE FOR INTER-FREQUENCY LOAD BALANCING IN A MOBILE TELECOMMUNICATIONS NETWORK

(71) Applicant: Telefonaktiebolaget L M Ericsson (publ), Stockholm (SE)

(72) Inventors: Sven Ekemark, Storveta (SE); Håkan Eriksson, Stockholm (SE); Lena Melin, Vaxholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 320 days.

(21) Appl. No.: 14/407,488

(22) PCT Filed: Oct. 2, 2014

(86) PCT No.: PCT/EP2014/071144
§ 371 (c)(1),
(2) Date: Dec. 12, 2014

(87) PCT Pub. No.: WO2016/050306
PCT Pub. Date: Apr. 7, 2016

(65) Prior Publication Data
US 2016/0277968 A1    Sep. 22, 2016

(51) Int. Cl.
H04W 28/08 (2009.01)
H04W 24/10 (2009.01)
(Continued)

(52) U.S. Cl.
CPC ........ *H04W 28/085* (2013.01); *H04W 24/10* (2013.01); *H04W 28/08* (2013.01);
(Continued)

(58) Field of Classification Search
CPC .............................. H04W 28/08; H04W 24/10
See application file for complete search history.

(56) References Cited

U.S. PATENT DOCUMENTS

2009/0163223 A1* 6/2009 Casey ................. H04W 36/22
455/453
2010/0214943 A1* 8/2010 Immendorf ........... H04W 24/00
370/252
(Continued)

FOREIGN PATENT DOCUMENTS

| EP | 2451214 A1 | 5/2012 |
| EP | 2728926 A1 | 5/2014 |
| WO | 2012125103 A1 | 9/2012 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.2.0, Jun. 2014, 1-365.
(Continued)

*Primary Examiner* — Xavier Szewai Wong
(74) *Attorney, Agent, or Firm* — Murphy, Bilak & Homiller, PLLC

(57) ABSTRACT

A method, system and device load balancing in a telecommunications network is provided where the selection of the one or more User Equipment (UE) 150, to be relocated from a source cell 112 to a target cell 122, is based on a prediction value of the performance in the target cell. The prediction of the performance in the target cell is performed by mapping the current load of the target cell and a current detected signal of the target cell, into a perceived performance, perceived by UEs that have been relocated previously. After relocation of the UE the perceived performance in the target cell is measured actually and fed back 312 by the target cell RBS 120 to the source cell RBS 110, and used for updating the predicted performance value.

24 Claims, 14 Drawing Sheets

(51) Int. Cl.
  *H04W 36/08* (2009.01)
  *H04W 36/22* (2009.01)
  *H04W 36/16* (2009.01)
  *H04W 36/00* (2009.01)

(52) U.S. Cl.
  CPC ........ *H04W 36/08* (2013.01); *H04W 36/0088* (2013.01); *H04W 36/165* (2013.01); *H04W 36/22* (2013.01)

(56) References Cited

U.S. PATENT DOCUMENTS

2010/0238884 A1    9/2010   Borran et al.
2010/0309782 A1*   12/2010   Lee ....................... H04W 48/16
                                                                       370/229
2014/0213256 A1*   7/2014   Meylan ................ H04W 36/22
                                                                        455/436

OTHER PUBLICATIONS

3GPP, "3rd Generation Partnership Project; Technical Specification Group Radio Access Network; Evolved Universal Terrestrial Radio Access Network (E-UTRAN); X2 application protocol (X2AP) (Release 12)", 3GPP TS 36.423 V12.2.0, Jun. 2014, 1-151.

* cited by examiner

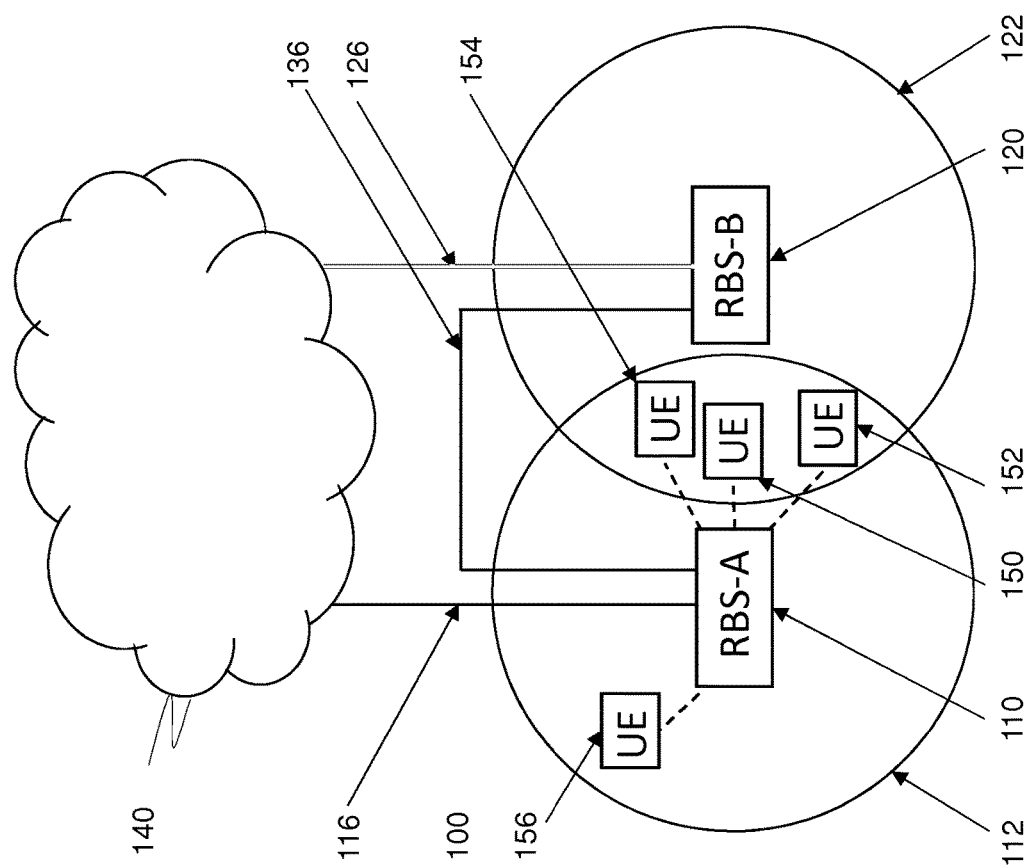

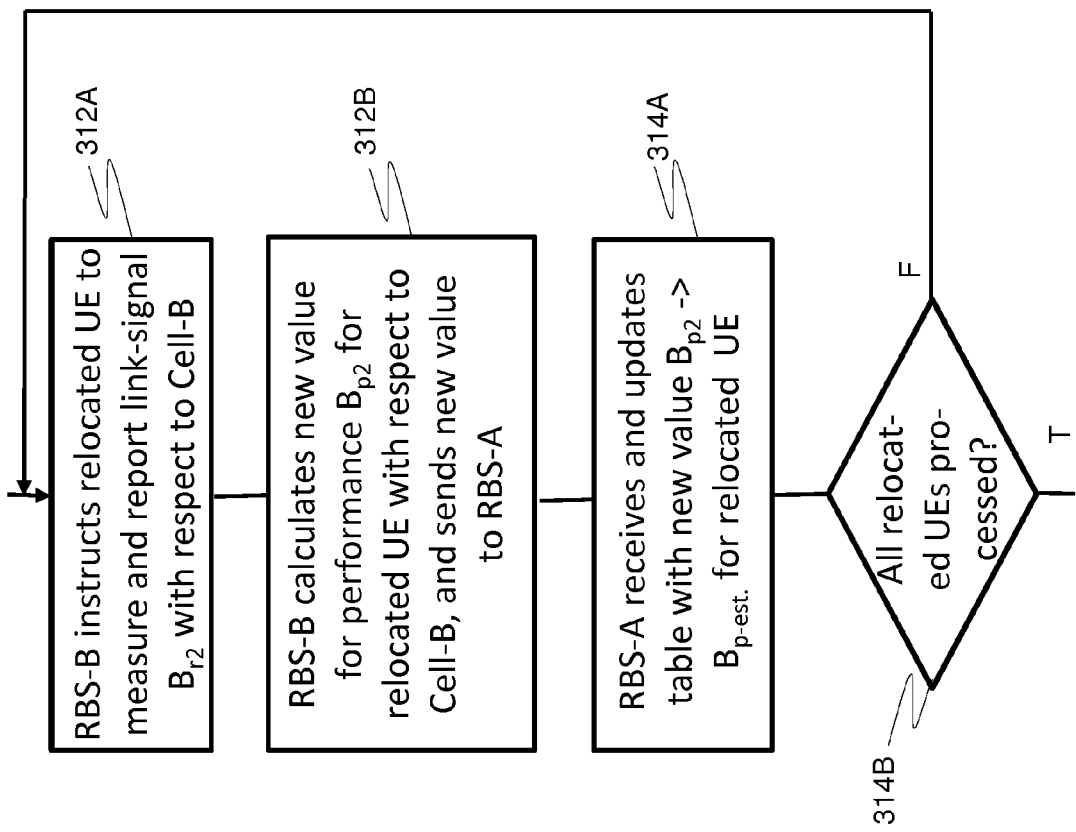

Performance mapping table.

| Calculated Performance By UE in Cell A w.r.t. Cell B, $B_{c1}$ | Perceived Performance for UE in Cell B, $B_{p\text{-est.}}$ |
| --- | --- |
| ..... | ..... |
| 150 | 51 |
| 151 | 52 |
| 152 | 53 |
| 153 | 53 |
| 154 | 54 |
| 155 | 54 |
| 156 | 55 |
| 157 | 55 |
| 158 | 54 |
| 159 | 55 |
| 160 | 56 |
| ..... | ..... |

| UE identifier | Performance Cell A, $A_{p1}$ | Performance Cell B, $B_{c1}$ | Mapped Perf. Cell B, $B_{p\text{-}est.}$ | Diff. $B_{p\text{-}est.} - A_{p1}$ |
|---|---|---|---|---|
| 532 | 56 | 156 | 55 | -1 |
| AA4 | 52 | 157 | 55 | +3 |
| 682 | 54 | 157 | 55 | +1 |
| 785 | 56 | 160 | 56 | 0 |
| B44 | 50 | 156 | 55 | +5 |
| C85 | 50 | 150 | 51 | +1 |
| C4A | 53 | 157 | 55 | +2 |
| 890 | 51 | 158 | 54 | +3 |
| ... | ... | ... | ... | ... |

| UE-Identity | Sequence | Est. Perf. $B_{p\text{-}est.}$ | Perc. Perf. $B_{p2}$ | Diff. |
|---|---|---|---|---|
| ..... | ..... | ..... | ..... | ..... |
| AA4 | 802 | 57 | 55 | |
| BX3 | 803 | 57 | 56 | ..... |
| 787 | 804 | 60 | 58 | ..... |
| 453 | 805 | 56 | 56 | .978 |
| C35 | 806 | 50 | 51 | .991 |
| C4X | 807 | 57 | 56 | .991 |
| 891 | 809 | 58 | 57 | .995 |
| ..... | ..... | ..... | ..... | ..... |

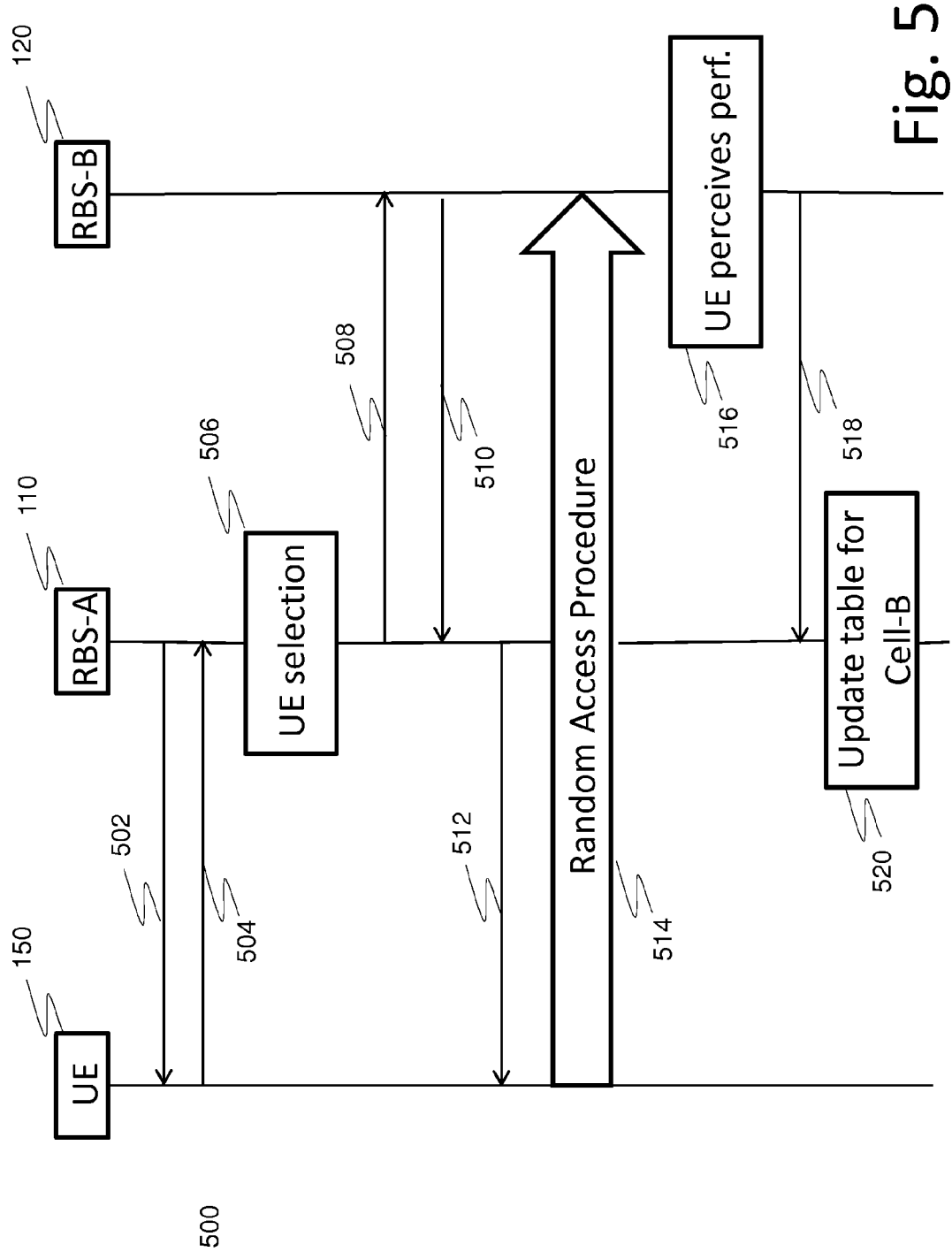

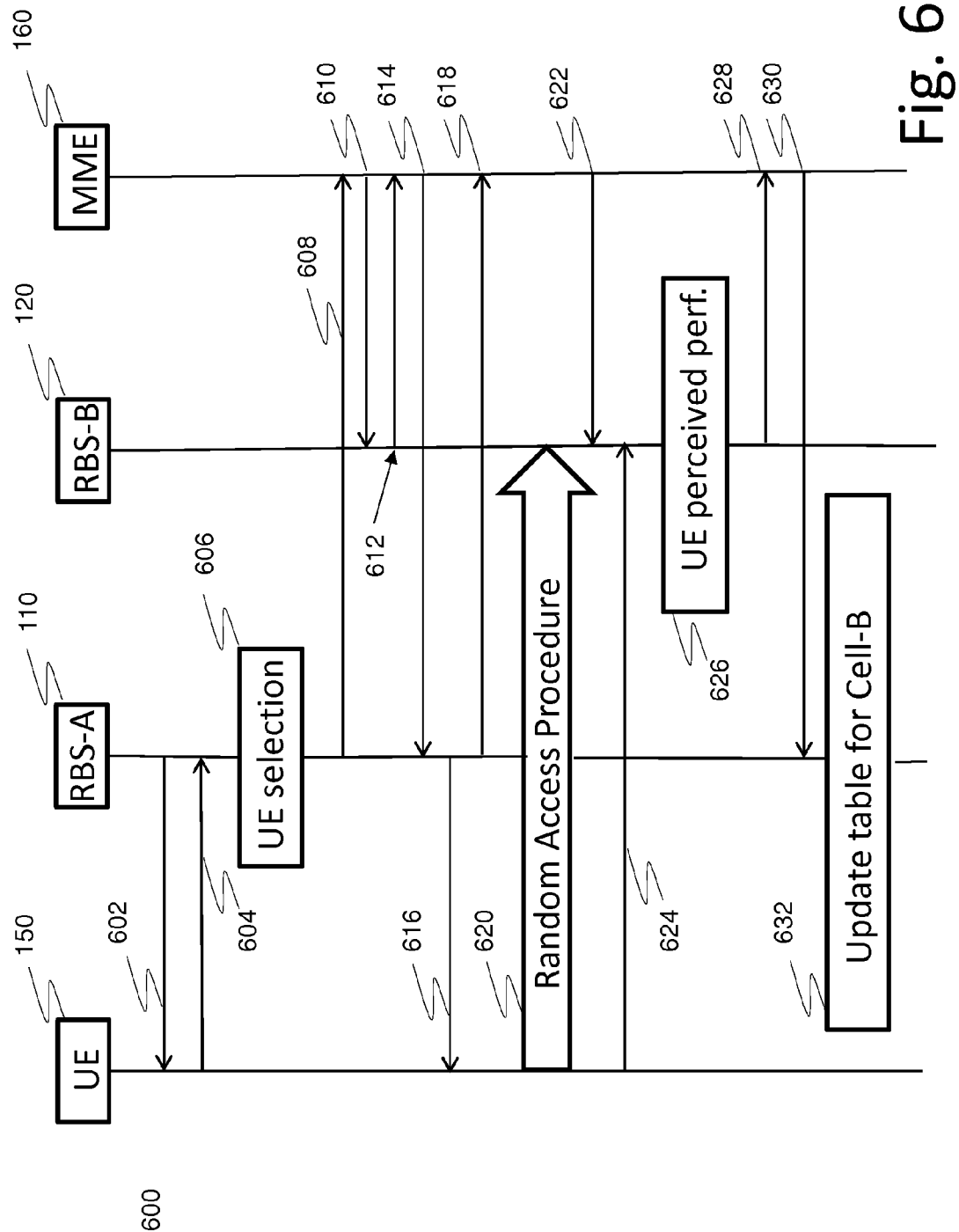

METHOD, SYSTEM AND DEVICE FOR INTER-FREQUENCY LOAD BALANCING IN A MOBILE TELECOMMUNICATIONS NETWORK

TECHNICAL FIELD

The present invention relates generally to a method, system and device to enable balancing of the load between serving areas of one or more radio base stations in a mobile network.

BACKGROUND

In a typical cellular network, also referred to as a wireless communication system, User Equipment (UE), communicate via a Radio Access Network (RAN) to one or more Core Networks (CNs).

A UE is referred to as a mobile terminal by which a subscriber can access services offered by an operator's CN. The UEs may be for example communication devices such as mobile telephones, cellular telephones, laptops, tablet computers or vehicle-mounted mobile devices, enabled to communicate voice and/or data. The wireless capability enables to communicate voice and/or data, via the RAN, with another entity, such as another UE or a server.

The cellular network covers a geographical area which is divided into cell based areas. Each cell area is served by a Base Station (BS), or Radio Base Station (RBS), which is also referred to as e.g. "evolved NodeB", "eNB", "eNodeB", "NodeB", "B node", or BTS (Base Transceiver Station), depending on the technology and terminology used.

The RBSs may be of different classes such as e.g. macro RBS, home RBS or pico RBS, based on transmission power and thereby also on cell size.

A cell is the geographical area where radio coverage is provided by the RBS at a RBS site. One RBS may serve one or more cells. Further, each RBS may support one or several communication technologies. The RBSs communicate over the air interface operating on radio frequencies with the UEs within coverage range of the RBSs.

The Universal Mobile Telecommunication System (UMTS) is a third-generation, 3G, mobile communication system, which evolved from the second-generation, 2G, Global System for Mobile communications (GSM), and is intended to provide improved mobile communication services based on Wideband Code Division Multiple Access (W-CDMA) access technology. UMTS Terrestrial Radio Access Network (UTRAN) is essentially a RAN using W-CDMA. The 3rd. Generation Partnership Project (3GPP) has undertaken to evolve further the UTRAN (and GSM) based radio access network technologies.

The Long Term Evolution (LTE) mobile communication system is defined as the fourth-generation mobile communication technology standard within the 3GPP as to improve the UMTS to cope with future requirements in terms of improved services such as higher data rates, improved efficiency, and lower costs. The UTRAN, being the radio access network of UMTS is further developed into an Evolved UTRAN (E-UTRAN), also referred to as a mobile broadband network, indicated as the radio access network of an LTE system. In an E-UTRAN, a UE is wirelessly connected to a RBS, commonly referred to as evolved NodeB (eNodeB or eNB).

FIG. 1 illustrates a block diagram of an E-UTRAN with RAN 100 comprising a first RBS 110, denoted as RBS-A that serves UEs 150, 152, 154, 156, located within the RBS-A's geographical area of service, called a first cell 112, or RBS-A's coverage. RBS-A serves the connected UEs 150, 152, 154, 156 depicted by means of dashed connecting lines. FIG. 1 illustrates two RBSs as an example. In practice a RBS is surrounded by- and connected to multiple RBSs.

The RAN of FIG. 1 additionally shows a neighboring second RBS 120, denoted as RBS-B comprised by the RAN, which has a geographical area of service, call a second cell 122, or cell coverage. RBS-B, although having UEs 150, 152, 154 within its area of service 122, is not serving one of these depicted UEs.

Both RBSs 110, 120, are communicatively connected via an X2-link 136 to each other enabling signaling, and are as well communicatively connected via respective S1-links 116 and 126, to a CN 140, comprising an Internet Protocol (IP) based Evolved Packet System (EPS) enabled to provide services to the UEs. The CN in an E-UTRAN system comprises a Mobility Management Entity (MME) which is the main signaling node in the EPC. The MME is responsible for initiating paging and authentication of the UE.

Other access technologies like GSM might apply a CN 140, comprising Radio Network Controllers, RNCs, and or Radio Base-station Controllers, RBCs, enabled to control the RBSs, and is, among other things, in control of management of radio resources in cells for which the RNC/RBC is responsible. The RNC/RBC enables communication between the RBSs. In general non-LTE networks have no direct links like the X2-link 136 between RBSs.

A RAN 100, such as an E-UTRAN, is often deployed on multiple carrier frequencies. A carrier frequency is the center frequency used for the radio communication between the RBS and the UE. Carrier frequencies are usually organized in radio frequency bands, the carrier frequencies bandwidth typically ranging from 5 to 20 MHz depending on the allocation of the Radio Frequency (RF).

A RBS may provide a number of radio cells on each carrier frequency, overlaid, overlaying or overlapping with each other or sectorized and pointing in different directions from the RBS.

FIG. 2A is a block-diagram showing a RBS 200 having a coverage in the shape of substantial circles 210, 220, each comprising a different carrier frequency, showing an a further example of a partly overlap. FIG. 2A is an example how a RBS in a multi-layered E-UTRAN could be implemented.

FIG. 2B is a block-diagram showing a RBS 250 having a coverage in the shape of substantial sectors 260, 270, also call beams, each comprising a different carrier frequency, showing a still further example of a partly overlap.

The UEs 150, 152, 154 within the overlapping area of coverage 112, 122 may access the CN 140 via a cell on either one of the overlapping carrier frequencies. UEs roaming in the network are moving between neighboring cells in order to stay in contact with the network. UE mobility between cells of different carrier frequencies is known as inter-frequency (IEF) mobility.

The CN 140 (or RBSs 110, 120), are usually in control of the mobility of UEs that are in connected mode. The term connected mode is used to denote the state of UEs with an active connection to the network, such as a Radio Resource Control (RRC) state RRC_CONNECTED in E-UTRAN.

In FIG. 1 the connected mode is depicted by the dashed lines between the RBS-A and the UEs 150, 152, 154. The RBSs perform a handover or relocation of a UE in connected mode when the UE is moving between cells. An IEF handover moves the connection of the UE between the cells controlled by the RBSs of different carrier frequencies.

UEs which do not have an active connection to the network are in idle mode. One example of an idle mode state is RRC_IDLE state in E-UTRAN.

Different cells and different carrier frequencies may offer system capacity that varies within a wide range. The cell configuration, the presence of radio interference, time-dispersion effects and the distribution of UEs within the cell affecting so called near-far-relations, are examples of factors influencing the system capacity. As to improve overall system performance a RBS has a mechanism to detect whether a relocation of UEs, eligible to be relocated, to neighbor RBSs would be beneficial for the system. The RBS driven relocation mechanism is known as Load-balancing. The purpose of load balancing is to distribute and equalize the traffic load presented to the E-UTRAN between the overlapping cells in such a way that the traffic load presented to each cell matches the traffic handling capacity of each cell in relation to the traffic handling capacity of the alternative overlapping cells The load balancing mechanism is performed by the RBSs applying handovers in order to handle the mobility of UEs in connected mode. In order to distribute and equalize the traffic load among the cells, the E-UTRAN is enabled to relocate a number of UEs in connected mode to neighboring cells as to perform load balancing.

Only UEs in the overlap are eligible for a handover. However in general the RBSs do not know whether a particular UE resides in the overlap, if no positioning means are applied.

An example of an IEF load balancing technology has a number of basic characteristics, presented as sequential steps:

1. Each RBS in the network is configured with a number of known RBS relations to neighbor cells within the network and in a multi-layer network, it includes cell relations to neighbor cells on other carrier frequencies.

2. The RBS may configure a UE, connected to the RBS, to perform IEF measurements on the other carrier frequencies. As a result, the UE may report neighbor cells next to where the UE is connected to, located on other carrier frequencies, which are transmitting radio signals, which the UE can receive with good signal strength and radio link quality. Only UEs in the overlap are in fact eligible for a handover. However in general the RBSs do not know whether a particular UE resides in the overlap, when no positioning means are applied. The connected UEs configured by the RBS to perform IEF measurements on other frequencies are in general selected randomly, such that it can be expected that statistically a part of configured UEs are resident in the overlap.

3. The RBS may consider the IEF neighbor cells frequently occurring in such measurement reports as suitable target cells for load balancing versus the RBS where the UE is connected to. When suitable load balancing target cells are identified, the RBSs within the network may setup intra-network signaling relations between those RBS, wherein, for instance, traffic load and cell traffic capacity information are repeatedly exchanged.

4. Based on the exchange of traffic load and cell traffic capacity information, the RBS is able to identify target cells on the other carrier frequencies to which there is a significant traffic load imbalance, hence where a certain amount of traffic load should be transferred to, in order to mitigate the present traffic load imbalance. The RBS acting as source cell in the transfer calculates the load balancing amount, thus the number of UEs to be relocated, for such transfer. For calculating the load balancing amount, the RBS assesses the traffic load in its own cell and exchanges load information according to the set of established neighbor cell relations between the cells on different carrier frequencies. The RBS uses the load information to determine how much traffic, or how many UEs that should be relocated in order to reach load balance between neighbor overlapping cells.

5. When the RBS of the source cell has determined a load balancing amount towards a particular target cell, the RBS of the source cell selects one or more UEs reporting the particular target cell as the best neighbor cell on that carrier frequency to be part of the traffic load transfer. Only for UEs that are within coverage of the target load balancing frequency carrier, an IEF handover is performed.

The source cell RBS initiates IEF handover of the selected UE from the source cell to the target cell. The selection and IEF handover of the UE may continue until either the determined load balancing amount is reached, or a reassessment of the traffic load balance between the two cells is performed.

It is regarded that the load balancing mechanism, described above, focuses on the traffic volume presented to each cell. The fruitful purpose of load balancing, should be to ensure that the individual UE service performance is optimized on the same time as the total system performance, i.e. by not wasting any system resources.

Therefor the selection of the UEs to be relocated to the neighboring cells is regarded a problem as only a reliable selection results in a successful load-balancing wherein the system as a whole performs better than before the load balancing action, and the relocated individual UEs perceive an equal or better service.

In heterogeneous network deployments, where the RBS sites providing overlapping cells on different carrier frequencies are not co-located, there may be large differences in the received radio link quality for the individual UEs, depending on whether the UE is connected via a close-by RBS site on one frequency or a more remote RBS site on another frequency.

In an IEF load balancing example, the source RBS in an E-UTRAN network, typically requires a minimum received Reference Symbol Received Power (RSRP) for the UE from the target cell, before a UE is selected for handover in order to even out an unbalanced load between the two cells. However, if the UE receives good radio link quality in the source cell, a minimum RSRP in the target cell does not guarantee even a matching radio link quality in the target cell. If a UE "accidently" is relocated from a cell where it receives good radio link quality into a cell where it receives poor radio link quality it may consume a lot of radio resource from the network, just in order to overcome the worse radio link quality in the target cell, thereby worsening the overall capacity of the target cell and providing a worse performance for the relocated UE.

Hence, when selecting a UE for relocation for load balancing reasons, it is regarded a problem to select the particular UE in a way taking the expected radio link quality in both the source and the intended target cell into account.

The RBS in an E-UTRAN, has typically a good knowledge about the radio link quality the UE receives in the current serving source cell. This information can be obtained from the radio link adaptation performed for the UE in the source cell.

Prediction of the radio link quality and the performance the UE perceives in an intended target cell, when based on the RSRP and Reference Symbol Received Quality (RSRQ) values, measured from target cell signaling by the UE connected to the source cell are insufficient, in particular when load balancing occurs in heterogeneous network where cell patterns may differ substantially or where the conditions to the particular UE are quite different.

In addition to the radio link quality in source and target cells, the selection of the UE for relocation is made more complex by e.g. the RF bandwidths of target cells, carrier aggregation capabilities, MIMO RI received from the UE, etc. as the RF bandwidth and MIMO configuration of an E-UTRAN cell may vary within a rather wide range.

SUMMARY

In view of the discussion above, it is an object for embodiments herein to provide an improved method, system and device for selecting User Equipment, UE, to enable a load balancing action in a cellular communication system.

In particular, it is an object for the embodiments to improve the performance of a UE that is relocated, as well as the total system performance, when subject to a load balancing action.

In an aspect of the invention a method for load balancing between cells in a communications network comprising a first Radio Base Station, RBS-A that is serving a first cell, Cell-A, and a second Radio Base Station, RBS-B that is serving a second cell, Cell-B where both cells are at least partly overlapping.

The RBS-A serves at least one UE, and, RBS-A and RBS-B are communicatively connected via a link.

As a first step the RBS-A selects at least one of the served UEs for measuring and reporting a performance in Cell-A and a performance in Cell-B, and the selected UEs present in the overlap, measure the performance in Cell-A and the performance in Cell-B, and report to RBS-A.

In a further step the UEs are determined and selected for a relocation by the RBS-A, based on the received performances and an estimated performance value for Cell-B, and a relocation by RBS-B is initialized of the one or more selected UEs for relocation from Cell-A to Cell-B.

In a still further step an indication is submitted to the RBS-B to respond with a perceived performance value measured by the one or more relocated UEs. The one or more relocated UEs measure a perceived performance in Cell-B, and reporting this value to RBS-B, and subsequently RBS-B provides RBS-A with a performance value based on the perceived performance by the relocated UE, for updating the estimated performance value for Cell-B.

In a further aspect of the method proposed, the step of determining and selecting the UEs for relocation comprises the further step of selecting the UEs to be relocated from a ranking, with the UEs having the highest signal gain after relocation, up to a determined number of UEs to be relocated to achieve a load balance.

In a still further aspect of the method proposed, the step of determining and selecting the UEs for relocation further comprises that the estimated performance value for Cell-B is derived from a value mapped to a function of the load of Cell-B and the measured performance of Cell-B by the UE being served by RBS-A.

In a still further aspect of the method is performed if the RBS-A detects that the requested capacity for Cell-A increases to a preconfigured value in relation the available capacity of Cell-A, and/or is performed continuously based on a time out of a timer.

In an aspect of the invention a method in a first Radio Base Station, RBS-A, for load balancing between cells in a communications network is proposed, wherein the network comprises a first cell, Cell-A, controlled by the RBS-A and a second cell, Cell-B, controlled by a second Radio Base Station, RBS-B, wherein both cells are at least partly overlapping.

RBS-A serves at least one User Equipment, UE, and RBS-A and RBS-B are communicatively connected via a link.

As a first step the RBS-A selects at least one of the served UEs for measuring and reporting a performance in Cell-A and a performance in Cell-B, and receives the reported performance in Cell-A and Cell-B.

As a further step RBS-A determines and selects the UEs for a relocation, based on the received performances and an estimated performance value for Cell-B, and initializes a relocation of the one or more selected UEs for relocation from Cell-A to Cell-B.

As a still further step RBS-A submits an indication to RBS-B to respond with a perceived performance value measured by the one or more relocated UEs.

As a still further step RBS-A receives a value based on the perceived performance value measured by the one or more relocated UEs, from RBS-B, and RBS-A updates the estimated performance value for Cell-B with the received value based on the perceived performance value.

In a further aspect of the method in RBS-A, RBS-A determines and selects the UEs for relocation the method comprises the further step of selecting the UEs to be relocated from a ranking with the UEs having the highest signal gain after relocation, up to a determined number of UEs to be relocated to achieve a load balance.

In a still further aspect of the method in RBS-A, RBS-A determines and selects the UEs for a relocation, the method comprises the further step that the estimated performance value for Cell-B is derived from a value mapped to a function of the load of Cell-B and the measured performance of Cell-B by the UE being served by RBS-A.

In a still further aspect of the method in RBS-A, RBS-A performs the method if RBS-A detects that that the requested capacity for Cell-A increases to a preconfigured value in relation the available capacity of Cell-A, and/or is performed continuously based on a time out of a timer.

In a still further aspect of the method in RBS-A, wherein RBS-A determines and selects the UEs for a relocation further comprises determining a number of UEs that are to be transferred to Cell-B, based on the load of Cell-A and the load of Cell-B.

In a still further aspect of the method in RBS-A, wherein the step that RBS-A determines and selects the one or more UEs to be relocated, is performed up to the determined number of EUs that are to be transferred to Cell-B.

In a still further aspect of the method in RBS-A, wherein the step that RBS-A claim RBS-A receives the reported performance in Cell-A and Cell-B, comprises the steps of receiving a signal quality report identifier $A_{r1}$ in respect of Cell-A, and receiving a signal quality report identifier $B_{r1}$ in respect of Cell-B.

In a still further aspect of the method in RBS-A, wherein RBS-A performs the further steps of calculating a performance identifier $A_{p1}$, identifying the performance of the at least one UE in respect of Cell-A, based on the signal quality report identifier $A_{r1}$ and calculating a performance identifier $B_{c1}$ in respect of the Cell-B from the reported signal quality identifier $B_{r1}$ and the load in the Cell-B.

The RBS-A performs as well the further step mapping the calculated performance identifier $B_{c1}$ to a corresponding estimated performance identifier $B_{p\text{-}est}$ indicating an estimated performance in Cell-B.

In a still further aspect of the method in RBS-A, the selection of the one or more UEs to be relocated, is based on a comparison comprising the performance identifier $A_{p1}$ and the estimated performance identifier $B_{p\text{-}est.}$ for relocation to Cell-B.

In a still further aspect of the method in RBS-A, the step of receiving a performance value step comprises receiving the perceived performance value, measured by the one or more relocated UEs from RBS-B. This perceived performance value represents a new value for perceived performance identifier $B_{p2}$. After receiving this value RBS-A updates the corresponding estimated performance identifier $B_{p\text{-}est.}$ with the value identified by identifier $B_{p2}$ for a next load balance.

In a still further aspect of the method in RBS-A, the method comprises the further steps of storing the performance identifier $A_{p1}$ of the at least one UE for Cell-A, and storing the calculated performance identifier $B_{c1}$ for mapping with the estimated performance identifier $B_{p\text{-}est.}$ In a still further aspect of the method in RBS-A, wherein the network is a Long Term Evolution, LTE, network, and the signal quality report identifier $B_{r1}$ is a function comprising Received Symbol Received Quality, RSRQ, and/or Received Signal Received Power, RSRP.

In a still further aspect of the method in RBS-A, the selecting step further comprises a selection based on exceeding a first threshold level with respect a function of the mapped corresponding performance indicator $B_{p\text{-}est.}$ and the with the performance identifier $A_{p1}$.

In a still further aspect of the method in RBS-A the selecting step further comprises a selection based on exceeding a configurable value for the mapped corresponding second performance indicator $B_{p\text{-}est.}$ In an aspect of the invention a method in a second Radio Base Station, RBS-B, for load balancing between cells in a communications network, wherein the network comprises a first cell, Cell-A, controlled by a first Radio Base Station, RBS-A, and a second cell, Cell-B, controlled by the RBS-B, both cells at least partly overlapping, RBS-A had served and relocated at least one User Equipment, UE, to RBS-B, wherein the relocation was based on an estimated performance value in Cell-B.

RBS-A and RBS-B are communicatively connected via a link.

As a first step the RBS-B receives an indication from the RBS-A to respond with a perceived performance value measured by the one or more relocated UEs.

As a further step RBS-B receives a report comprising a measurement by the one or more relocated UEs of a perceived performance in Cell-B.

As a still further step RBS-B provides a value based on the perceived performance by the relocated UE, to RBS-A for updating the estimated performance value in Cell-B.

In a still further aspect of the method in RBS-B, the step of receiving further comprises instructing the relocated UE, after a relocation from Cell-A to Cell-B, to measure and report a perceived signal quality report identifier $B_{r2}$ with respect to Cell-B.

The method further comprises that RBS-B receives the reported measured perceived signal quality report identifier $B_{r2}$, and wherein the method further comprises the step of calculating a perceived performance identifier $B_{p2}$ in respect of Cell-B from the reported perceived signal quality identifier $B_{r2}$ and the load in the Cell-B.

The method still further comprises that RBS-B providing the calculated perceived performance identifier $B_{p2}$, to RBS-A for updating the its table with the estimated performance value indicator $B_{p\text{-}est.}$ In a still further aspect of the method in RBS-B the calculating step comprises that the perceived performance identifier $B_{p2}$ is a function of the reported signal quality identifier $B_{r2}$ and the load in Cell-B.

In a still further aspect of the method in RBS-B the network is a Long Term Evolution, LTE, network, and the signal quality report identifier $B_{r2}$ is a function comprising Received Symbol Received Quality, RSRQ, and/or Received Signal Received Power, RSRP.

In a still further aspect of the method in RBS-A and RBS-B the method is applied in a Long Term Evolution, LTE, network and the RBS-A and RBS-B are eNodeBs.

In an aspect of the invention a system arranged for load balancing between cells in a communications network is proposed wherein the network comprises a first Radio Base Station, RBS-A, serving a first cell, Cell-A, and a second Radio Base Station, RBS-B, serving a second cell, Cell-B, wherein both cells at least partly overlapping.

The RBS-A serves at least one User Equipment, UE, and RBS-A and RBS-B are communicatively connected via a link.

The RBS-A of the system is arranged to select at least one of the served UEs to measure and report a performance in Cell-A and a performance in Cell-B.

The selected UEs present in the overlap, are arranged to measure the performance in Cell-A and the performance in Cell-B, and to report to RBS-A.

The RBS-A is further arranged to determine and select the UEs to be relocated, based on the received performances and an estimated performance value for Cell-B.

The RBS-A is further arranged to initialize a relocation of the one or more selected UEs for relocation from Cell-A to Cell-B.

The one or more relocated UEs are further arranged to measure a perceived performance in Cell-B, and to report this measurement to RBS-B, and the RBS-B is arranged to provide a value based on the perceived performance by the relocated UE, to RBS-A for an update of the estimated performance value for Cell-B.

In an aspect of the invention a first Radio Base Station, RBS-A device arranged for use in a cellular communication network system is proposed, wherein the RBS-A is further arranged for a load balance action between cells in the communications network the wherein the RBS-A comprises a processor module arranged to process program instructions, a memory module arranged to store the program instructions and network parameters and an interface module arranged to connect to other network entities.

The RBS-A further comprises a map module arranged to map a measured performance and an estimated performance in an overlapping cell, wherein the measured performance and the estimated performance are comprised in a table.

The RBS-A still further comprises a selector module to select User Equipment, UEs for a relocation arranged to select and decide a on a number of UEs to be relocated, the decision based on the mapped estimated performance and the measured performance in the overlapping cell.

The RBS-A still further comprises an update module arranged to update the table with a received perceived performance in the overlapping cell, and wherein the processor module further arranged, under the program instructions, to control the interface module, the map module, the load balance decision module, and the update module.

In a further aspect of RBS-A, the selector module is arranged to cooperate with a rank selector module (706) to select the UEs to be relocated according to a ranked order wherein the UE's exceeding a first threshold are selected.

In a still further aspect of RBS-A, the RBS-A further comprises an instruction module, arranged to instruct the selected UEs, connected to RBS-A, to measure and report a performance signal of another RBS, RBS-B.

The RBS-A further arranged to initialize relocation for the UEs selected to be relocated by the selection module.

In an aspect of the invention a second Radio Base Station, RBS-B device arranged for use in a cellular communication network system is proposed, wherein the RBS-B is further arranged for cooperation with a first Radio Base Station, RBS-A, in a load balance action between cells in the communications network the wherein the RBS-B comprises a processor module arranged to process program instructions, a memory module arranged to store the program instructions and network parameters and an interface module arranged to connect to other network entities.

The RBS-B further comprises an instruct module arranged to instruct a relocated User Equipment, UE from another cell to the cell controlled by RBS-B, Cell-B, to measure and report a performance signal in Cell-B, wherein the UE is relocated in a load balance action initialized by an RBS-A.

The RBS-B's interface module is further arranged to receive a reported perceived performance in Cell-B by the relocated UE.

The RBS-B's the interface module is further arranged to transmit a value based on the reported perceived performance by the relocated UE, to the RBS-A for updating an estimated performance value in Cell-B.

The RBS-B's processor module is further arranged, under the program instructions, to control the interface module and the instruct module.

In a further aspect of the RBS-A and RBS-B devices, these devices operate in a communication network system that is a Long Term Evolution, LTE, network or a Voice over LTE, VoLTE network, and wherein the RBS-A and RBS-B are an evolved Node Bs (eNodeBs).

In an aspect of the invention a computer program is proposed, which, when being executed by a processor module in a first Radio Base Station, RBS-A, the RBS-A is enabled to carry out or control a method for a load balance in a communications network that comprising a first cell, Cell-A, controlled by RBS-A and a second cell, Cell-B, controlled by a second Radio Base Station, RBS-B, where both cells at least partly overlap.

The RBS-A serves at least one User Equipment, UE, and RBS-A and RBS-B are communicatively connected via a link.

The computer program enables RBS-A performs the steps of selecting at least one of the served UEs for measuring and reporting a performance in Cell-A and a performance in Cell-B, and receiving the reported performance in Cell-A and Cell-B.

The computer program further enables RBS-A to determine and select the UEs for a relocation, based on the received performances and an estimated performance value for Cell-B.

The computer program further enables RBS-A to initializing a relocation of the one or more selected UEs for relocation from Cell-A to Cell-B.

The computer program further enables RBS-A to submitting an indication to RBS-B to respond with a perceived performance value measured by the one or more relocated UEs.

The computer program further enables RBS-A to receive the value based on the perceived performance value measured by the one or more relocated UEs, from RBS-B, and subsequently updating the estimated performance value for Cell-B with the received value based on the perceived performance value.

In a further aspect of the computer program, the computer program enables RBS-A to perform the step of determining the UEs for relocation by selecting the UEs to be relocated from a ranking with the UEs having the highest signal gain after relocation, up to a determined number of UEs to be relocated to achieve a load balance.

In a still further aspect of the computer program, the computer program enables RBS-A to perform step of determining the UEs for a relocation by deriving the estimated performance value for Cell-B, from a value mapped to a function of the load of Cell-B and the measured performance of Cell-B by the UE being served by RBS-A.

In a still further aspect of the computer program, the computer program enables RBS-A to perform the load balancing action steps when RBS-A detects that that the requested capacity for Cell-A increases to a preconfigured value in relation the available capacity of Cell-A, and/or is performed continuously based on a time out of a timer.

In a further aspect of the invention a first Radio Base Station, RBS-A, is proposed wherein the RBS-A performs a load balance action in a communications network, wherein the network comprising a first cell, Cell-A, controlled by RBS-A and a second cell, Cell-B, controlled by a second Radio Base Station, RBS-B, and wherein both cells at least partly overlap.

The RBS-A serves at least one User Equipment, UE, and RBS-A and RBS-B are communicatively connected via a link.

The RBS-A comprises a receive module for receiving the load of RBS-B.

The RBS-A further comprises a select module for selecting at least one of the served UEs for measuring and reporting a performance in Cell-A and a performance in Cell-B.

The RBS-A still further comprises a calculator module for calculating a performance in Cell-B, based on measurements made by a UE.

The RBS-A still further comprises a map module for mapping the calculated performance to an estimated performance in Cell-B.

The RBS-A still further comprises a determination module for determining the number of UEs for a relocation, based on the received performances and an estimated performance value for Cell-B.

The RBS-A still further comprises a rank and select module for selecting UEs to be relocated for achieving a load balance.

The RBS-A still further comprises an initialization module for initialization of a relocation of the selected UEs from Cell-A to Cell-B.

The RBS-A still further comprises an indicator module for indicating to the RBS-B to respond with a perceived performance value measured by the one or more relocated UEs, and the RNS-A still further comprises a store module for storing a received perceived performance in Cell-B of the relocated UEs, thereby updating the estimated performance in Cell-B.

These and other embodiments according to the present invention are now illustrated in more detail with reference to the enclosed drawings.

BRIEF DESCRIPTION OF THE DRAWINGS

FIG. 1 is a block diagram illustrating an embodiment of a system;

FIG. 3E is a flowchart illustrating an embodiment of method steps;

FIG. 4A is a table illustrating an embodiment of method steps;

FIG. 4B is a table illustrating an embodiment of method steps;

FIG. 4C is a table illustrating an embodiment of method steps;

FIG. 5 is a signalling diagram illustrating an exchange of signals in an embodiment of the system;

FIG. 6 is a signalling diagram illustrating an exchange of signals in an embodiment of the system;

DETAILED DESCRIPTION

Figure 2B:
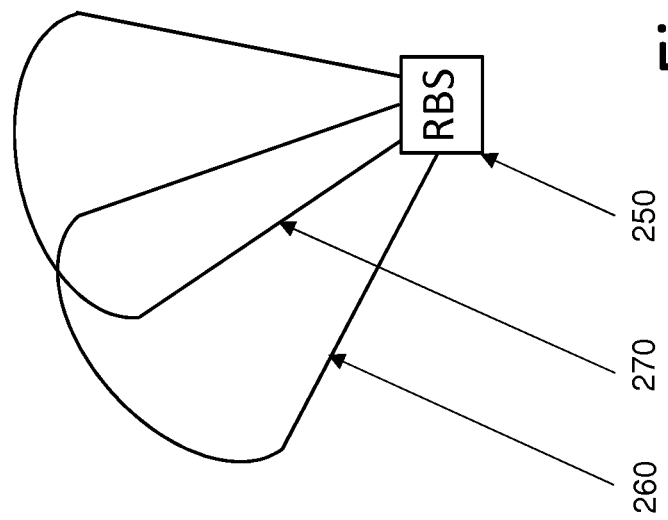
FIG. 2B is a block diagram illustrating an embodiment of a system.
Figure 2A:
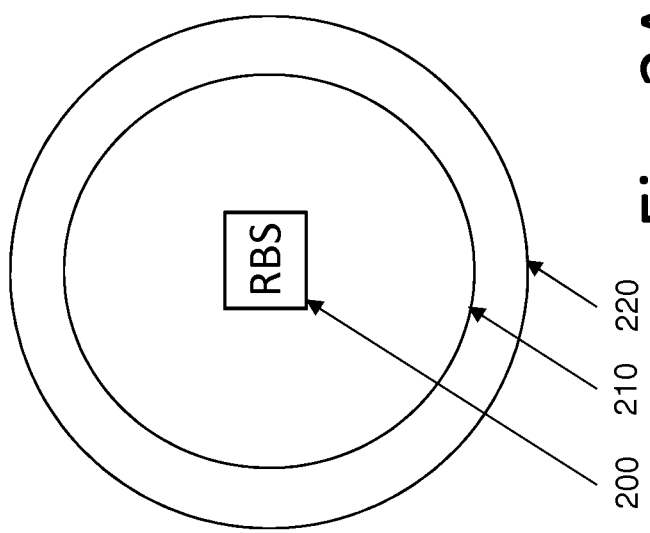
FIG. 2A is a block diagram illustrating an embodiment of a system.

With reference to FIGS. 1, 2A and 2B, the explanation of the improved load balancing system in a cellular communications system is presented in the implementation of an Evolved—Universal Mobile Telecommunication (UMTS) Terrestrial Radio Access Network (E-UTRAN) system. The improved load balancing system as presented could however be applied as well in other cellular network systems like e.g. Global System for Mobile communication (GSM), Personal Handy System (PHS), Universal Mobile Telecommunications System (UMTS), Digital Enhanced Cordless Telecommunications (DECT), Digital Advanced Mobile Phone System (AMPS) (IS-136/Time Division Multiple Access (TDMA)).

In this explanation a reference to a Long Term Evolution (LTE) network may be equated with the E-UTRAN system, and a Radio Base Station (RBS) may be equated with an evolved NodeB (eNodeB) as applied in the LTE network.

The explanation equates a carrier frequency with a physical cell as a way to ease the explanation, although cells as shown in FIG. 2A can be implemented as overlapping concentric substantial circles, having more than one carrier frequency, it is regarded that in FIG. 2A there are two different carrier frequencies. FIG. 2B with the two sectored beams depicted are to be regarded as two carrier frequencies representing two cells.

When balancing the load between different cells, in the LTE network the goals are preferably twofold: to optimize the overall system performance and as well to optimize the individual User Equipment (UE) experienced service performance. To achieve a load balancing certain UEs needs to be selected to be relocated between cells, by means of an algorithm that keeps track of the changing conditions in the cells concerned. The invention presented provides a solution for both goals by an appropriate selection mechanism for selecting the UEs for relocation.

With reference to FIG. 1, a relocation of the UE 150 is in this explanation meant to be move or transfer of the connection of the UE 150 with a first Radio Base Station, RBS-A 110 to a second Radio Base Station, RBS-B 120, wherein RBS-A controls the first cell, Cell-A 112, and RBS-B controls a second cell, Cell-B 122.

The load balancing is presented to be performed by RBS-A, resulting in a relocation from Cell-A to Cell-B, with cooperation of RBS-B. As however more than one RBS should be understood to apply the method presented, load balancing should also occur with the same mechanism by RBS-B from Cell-B to Cell-A, or to other cells with overlapping coverage.

The purpose of the improved load balancing is to improve the selection of UEs to be relocated between overlapping cells. When selecting a UE for relocation the estimated or expected performance or radio link quality in both the source and the target cell is taken into account.

Particularly in heterogeneous network topologies it is regarded not sufficient to select which UEs have to be relocated on what the UE can measure, i.e. the Reference Symbol Received Power (RSRP) and Reference Symbol Received Quality (RSRQ) values of the source cell (Cell-A) and the target cell (Cell-B). There is no direct relation between certain combinations of RSRP/RSRQ in one cell and another when it comes to relation to performance, or throughput. A UE performance in Cell-A=f(RSRP, RSRQ, load)≠UE throughput in Cell-B=f(RSRP, RSRQ, load). This is valid even if the figures for the parameters are equal as the functions may differ.

If a UE is selected only on the basis of measured RSRP/RSRQ and cell-load this might result in that the UEs will experience worse performance after the load balancing action.

The improved load balancing method enables a better prediction of UE performance which optimizes the service performance for individual UEs and for the system as a whole.

Figure 3A:
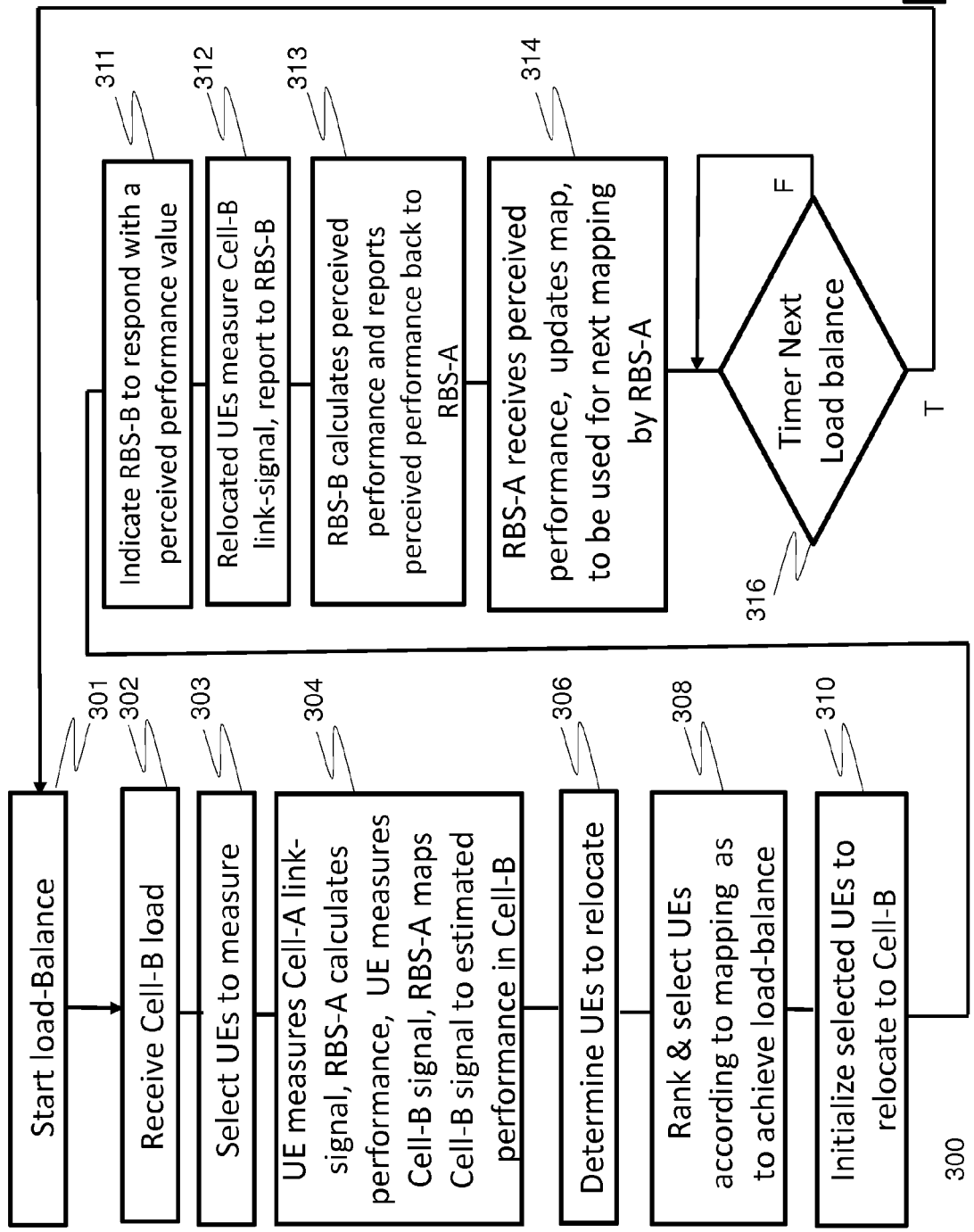
FIG. 3A is a flowchart illustrating an embodiment of method steps.

FIG. 3A is a flowchart illustrating an embodiment of method steps in the E-UTRAN performing an improved load balancing action 300. FIG. 3A represents a loop which is understood to have a continuous character, or operates on detection of a load-balance as described 301 below. RBS-A initializes a load balancing action, taking into account the Quality of Service (QoS) requirements of each particular served UE as determined in the load-balancing determination 301 versus the available capacity, how many of the served and measuring UE's should be relocated to another cell.

In FIG. 3A blocks 302-314 are depicted in a certain order. However the order as depicted does not necessarily means that is order is required. In particular where there is no interdependence between blocks, the order in execution can be any order.

RBS-A 110 receives 302 the load in Cell-B 122. It is assumed that there is a continuous exchange of cell load measurements between the cells in the neighbouring cells in the system. So that source RBS-A is aware of the actual load in its neighbouring Cell-B 120, regarded the potential target for a load balance action. Alternatively RBS-A request RBS-B for the load in Cell-B via its X2 link 136. Further alternatively a common node, such as a Radio Network Controller node in W-CDMA, acts as a common node that collects the load information for each RBS and distributes the load to other RBSs frequently, or provides on request.

The Served UEs 150, 152, 154, 156 continuously perform measurements in the source cell Cell-A 112, where they reside.

The RBS-A selects 303 from its served UEs 150, 152, 154, 156 a number of UEs that have to perform a link-signal measurement on a particular carrier-frequency of its own and neighbouring RBS. A RBS is provisioned during installation with information of its neighbouring cells, such as RBS identities, link address information and applied carrier frequencies of these cells. The selection of the UEs for measuring on a carrier frequency applied in Cell-B yields a statistically defined number of UEs instructed 304A to perform and report the Cell-A and Cell-B carrier frequency measurement.

Regarding the measurements of the carrier frequency of Cell-A and Cell-B:

UEs in connected mode can be configured by the RBS to measure radio quality (RSRP, RSRQ)—for own cell and neighbor cells on other carrier frequencies—and it will then send the measured result to the own cell in an RRC Measurement Report.

UEs in connected mode need always to send Channel Feedback reports (e.g., Channel Quality Indication (CQI), Rank Indication (RI), Pre-coding-Matrix Indicator (PMI)) with regular intervals—for own cell only—this is the UEs estimation of the current link quality. Values are normally used by baseband (for scheduling, link adaptation etc.).

In this presentation the measurements on both the Cells, Cell-A and Cell-B are supposed to be based in Measurement Reports, although optionally the measurement in Cell-A could also be based on the Channel Feedback Report or a combination of both reports.

The selection of the UEs for the measurements can alternatively be performed by using a filter, based on various radio characteristics, e.g. UE throughput or Reference Symbol Received Power (RSRP)/Reference Symbol Received Quality (RSRQ) in the source cell (Cell-A). Other criteria could be indicated (evolved) Multimedia Broadcast and Multicast Services (MBMS) interest, carrier aggregation capabilities, subscription type, International Mobile Subscriber Identity (IMSI) etc.

As an example it is suggested that UEs 150, 152 and 156 are selected for a measurement of Cell-A and Cell-B. Only UEs 150 and 152 will return a measurement for Cell-B as these UEs reside in the overlap and are able to receive a signal in Cell-B.

Based on the reported link-signal of Cell-A and the load in Cell-A, RBS-A calculates 304B a performance identifier for Cell-A, and based on the reported Cell-B signal and the Cell-B load, RBS-A calculates 304D a performance identifier for Cell-B.

The calculated performance identifier for Cell-B, is mapped by RBS-A to an estimated performance value representing an up to date performance which UEs to be relocated will experience in Cell-B. This estimated value is based on the perceived performance measured by previously relocated UEs.

RBS-A determines 306, taking into account the Quality of Service (QoS) requirements of each particular served UE as determined in the load-balancing determination 301 versus the available capacity, how many of the served and measuring UE's should be relocated to another cell.

By ranking 308 the UEs according to the estimated performance in Cell-B and the calculated performance in Cell-A, RBS-A is enabled to select which UE has to be relocated. As an example UE 150 qualifies according to a ranking to be relocated, has having sufficient signal gain after relocation to Cell-B.

RBS-A initializes 310 a relocation of the selected UE 150 to Cell-B. Summarizing the example process so far:

UEs 150, 152, 154, 156 are served by RBS-A;

UEs 150, 152, 156, are selected to perform a Cell-B measurement;

UEs 150, 152 report a Cell-B measurement, and

UE 150 is selected to be relocated based on ranking.

After relocation of the UE 150 to Cell-B, the relocated UE measures and reports 312 its link signal in Cell-B to RBS-B. RBS-B calculates from the reported measured signal and the Cell-B load a perceived performance identifier of Cell-B, and provides RBS-A with this performance identifier.

In this presentation the measurements in this phase after the relocation in Cell-B is supposed to be based on a Channel Feedback Report, as the UE is in a connected mode with RBS-B.

Optionally the measurement in Cell-B could be based on the Measurement Report (RSRP, RSRQ) after being configured by RBS-B to do so.

Further optionally a combination of a compilation of both the Channel Feedback Report and the Measurement Report could be compiled and send to RBS-A.

RBS-A, receiving 314 the perceived performance identifier, updates its map, there by receiving a new value for the estimated performance value in Cell-B.

A timer restarts 316 the loop 300 on frequent basis, or alternatively the loop 300 can be started when a load balance is initiated by detection 301 in RBS-A that the Cell-A capacity is reached.

Each Evolved-Radio Access Bearer (E-RAB) configured for a specific UE is assigned an amount of Quality of Service (QoS) Class Indicator (QCI) Subscription Quanta, based on the QoS class it belongs too. This is an operator configurable quantity (qciSubscriptionQuanta).

The value of the QCI Subscription Quanta reflects the amount of radio resource typically required to satisfy the expected QoS for an E-RAB with the given QCI. In addition, each E-UTRAN cell is assigned a Cell Subscription Capacity value. This is also an operator configurable parameter (cellSubscriptionCapacity).

The Cell Subscription Capacity value reflects the total amount of QCI Subscription Quanta the cell is able to handle with an acceptable QoS level.

The traffic load definition we are using is the ratio between the total amount of QCI Subscription Quanta aggregated in the cell (for all connected UE) and the Cell Subscription Capacity value:

$$sRatio = (\Sigma qciSubscriptionQuanta / cellSubscriptionCapacity)$$

The sRatio is a value $\geq 0$, where zero represents a completely unloaded cell, values in the range 0,0-1,0 is the typical operating range for the cell and values >1,0 represents an increasing grade of overload. An operator configurable parameter on the sRatio value starts 301 the load-balance action.

A practical value for the loop timing 316 is between 5 and 30 s, typically 15 s. depending on RBS deployment, time of day, etc.

Figure 3B:
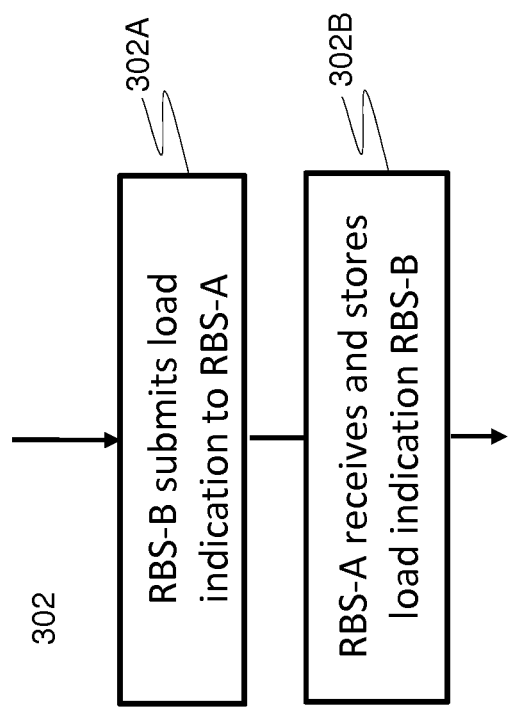
FIG. 3B is a flowchart illustrating an embodiment of method steps.

FIG. 3B is a flowchart illustrating an embodiment of method steps in the E-UTRAN 100 performing an improved load balancing action 300 focussing on the receiving the load in Cell-B 122 by RBS-A 110.

RBS-B 120 submits 302A Cell-B's load indication, either autonomously or on request to RBS-A, where after RBS-A stores 302B this indication for further processing.

Figure 3C:
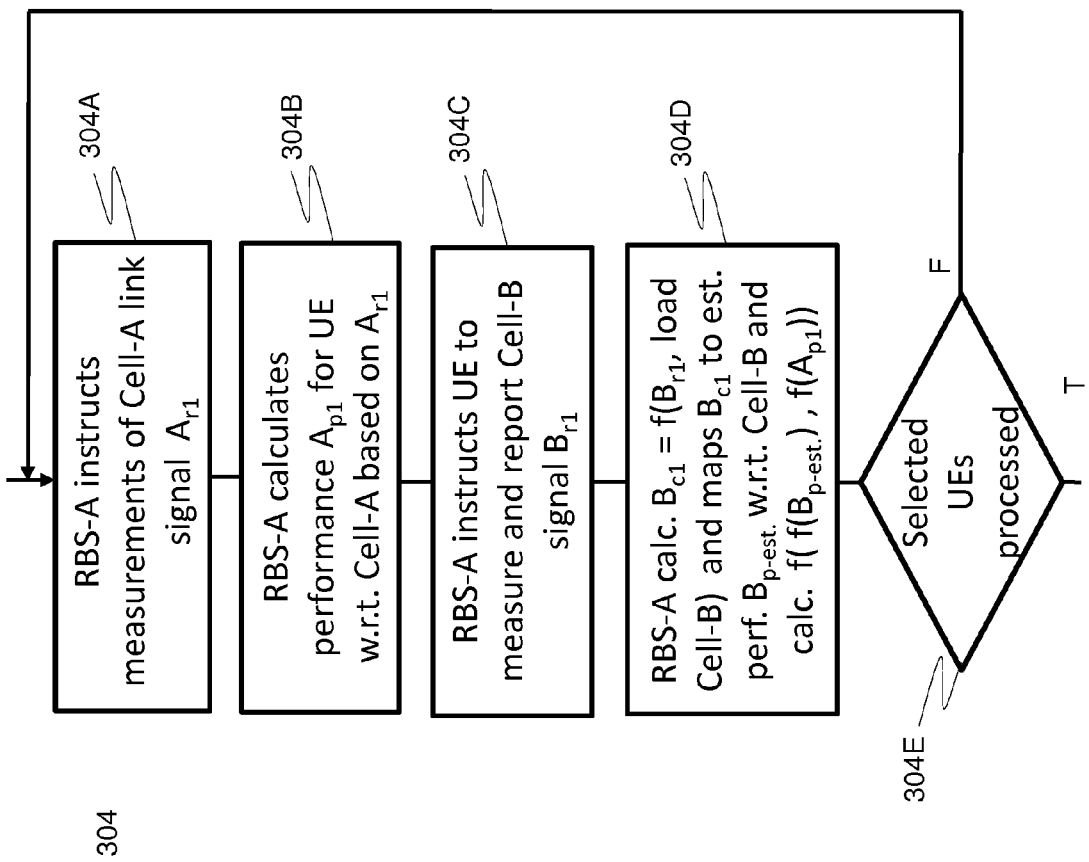
FIG. 3C is a flowchart illustrating an embodiment of method steps.

FIG. 3C is a flowchart illustrating an embodiment of method steps in the E-UTRAN 100 performing an improved load balancing action 300 focussing on the measurement receiving and mapping step 304 by RBS-A 110. The boxes in FIG. 3C can be in any order or executed in parallel, as long as not depending on each other.

The UEs 150, 152, 154, 156, served by RBS-A measure the signal in Cell-A 112 and report a link signal $A_{r1}$ to RBS-A.

Based on the reported measurements, RBS-A calculates 304B a performance identifier $A_{p1}$ for the UEs in Cell-A.

RBS-A selects 304C from its served UEs a number of UEs to do measurements for Cell-B 122, in the example above UEs 150, 152, 156 are selected. Only UEs 150, 152 report a signal with respect to Cell-B as they reside as well in Cell-A and Cell-B.

An event, such as for example the A5 event, described in section 5.5.4.6 3GPP TS 36.331, is triggered and the UEs sends a Radio Resource Control (RRC) Measurement Report to the RBS-A. Measured Reference Symbol Received Power (RSRP) and Reference Symbol Received Quality (RSRQ) values are included. A measurement event is triggered when the measured quantities fulfil the criterion for sending a Measurement Report by the UE, in this case reporting the signal with respect to Cell-B.

The signal measures with respect to Cell-A (the serving cell) are also included in the report RBS-A calculates 304D an identifier $B_{c1}$ being a function of the reported signal in Cell-B and the load in Cell-B:

$$B_{c1} = f(B_{r1}, \text{load-Cell-}B).$$

The calculated identifier $B_{c1}$ is mapped to an estimated performance value $B_{p\text{-}est}$ as to obtain a reliable performance that can be expected after a relocation of the UE, to be selected for relocation. Subsequently RBS-A calculates the performance gain following relocation by executing a function comprising the current performance in Cell-A and the estimated performance in Cell-B:

$$\text{Performance Gain: } f(f(A_{p1}), f(B_{p\text{-}est}))$$

Figure 3D:
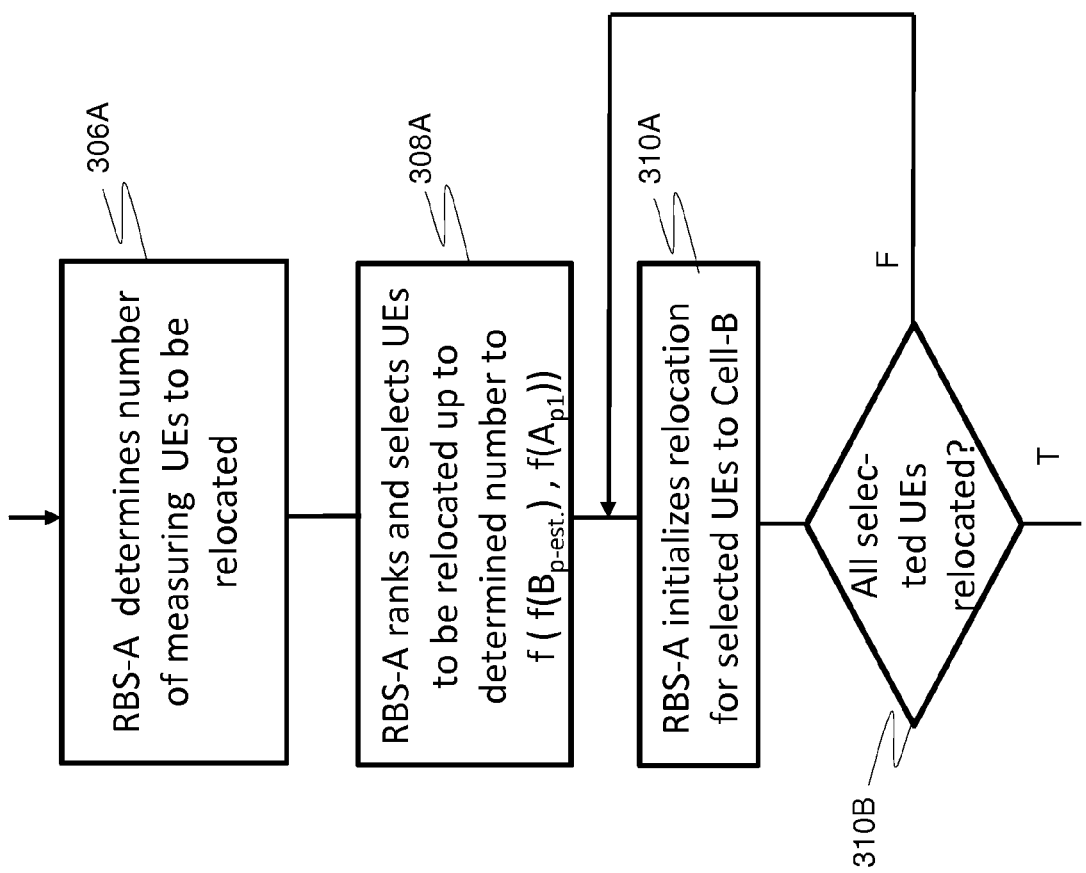
FIG. 3D is a flowchart illustrating an embodiment of method steps.

Process 304 is executed for the UEs served by RBS-A and selected 303 for measurement of Cell-B, either sequentially performed in a loop 304E or alternatively in parallel FIG. 3D is a flowchart illustrating an embodiment of method steps in the E-UTRAN 100 performing an improved load balancing action 300 focussing on the selection and relocation steps 304, 310 of the UEs by RBS-A 110.

RBS-A determines 306A how much of the measuring UEs 150, 152 should be relocated. UE's ranked with the highest Performance Gain, are up to the defined number, selected for relocation to Cell-B 122. The ranking 308A of the Performance Gain f(f(Ap1), f(Bp-est.)) includes a threshold value as separating UEs with a higher and lower ranking. A side effect is that relocating back and forth between cells deploying this improved load-balance method is reduced, albeit that a threshold in initializing a load-balance is primarily intended for this back relocating due to load balancing.

Only the UEs with the highest Performance Gain after relocation exceeding the threshold value are selected 308A for relocation.

As an example only UE 150 is ranked sufficiently high to be relocated. RBS-A initializes 310A the relocation of the selected UE 150 from Cell-A 112 to Cell-B.

The relocation action is either performed as a sequential process 310B in a loop for the selected UEs or in parallel.

FIG. 3E is a flowchart illustrating an embodiment of method steps in the E-UTRAN 100 performing an improved load balancing action 300 focussing on the cooperating steps of RBS-B 120.

RBS-B instructs 312A the relocated UE 150 to measure and report on the link signal $B_{r2}$ in Cell-B after the relocation of the UE 150, alternatively the relocated UE 150 continuously perform measurements in the target cell Cell-B 122, as being connected now to RBS-B.

Based on the reported link signal $B_{r2}$, RBS-B calculates 312B an identifier identifying a value for the perceived performance $B_{p2}$ by UE 150, and submits this performance identifier $B_{p2}$ to RBS-A 110 via its link 136.

RBS-A receives 314A the performance identifier $B_{p2}$ and applies this identifier to update and maintain the map for the corresponding estimated performance identifier $B_{p\text{-}est}$.

The measurement and update action is either performed as a sequential process 314B in a loop for the relocated UEs or in parallel. Alternatively the provision of the new value for the performance identifier $B_{p2}$ to RBS-A is submitted once all relocated UE's in the session 312 have provided their reports $B_{r2}$.

This performance identifier $B_{p2}$ is fed back to the source cell (Cell-A) in a message such as part of a UE Context Release message, described in section 8.2.3 in 3GPP TS 36.423., or an X2 RRC Private Message. The UE Context Release procedure is standardized to inform the source RBS (RBS-A) of handover success and trigger release of the resources in the source RBS.

With the update the estimated performance identifier with respect to Cell-B $B_{p\text{-}est}$ is provided with a most recent value for the estimated performance in Cell-B, enabling a next load balancing action with reliable and accurate parameters for selecting which UEs should be relocated. UEs with a relatively poor performance or throughput prediction in the target cell are not selected for relocation.

The performance or throughput gain for a relocated UE, calculated in this way, for a large number of UEs typically presents a statistic distribution, which is specific for each source (Cell-A) to target (Cell-B) cell relation. Based on the UE selection history, the RBS maintains a threshold for each source to target cell relation, which splits the corresponding throughput gain distribution in two parts of certain percentage each. The threshold level is a predetermined value or alternatively adjusted in a feedback loop at each new UE selection, in order to maintain the desired (configured) percentage split.

The key element of the invention is the feedback loop wherein the results of the UE throughput evaluation in the target cell after relocation is fed back to the source cell at UE context release and used to update and maintain a mapping of the measurement results (RSRP and/or RSRQ values), received from the UE before the relocation, to a UE throughput prediction for UE with similar measurement results.

FIG. 4A is a table illustrating an embodiment of method steps of the improved load balancing action 300 focusing on the mapping table 400A as applied in steps 304, 304D.

The left column comprises the calculated performance identifier $B_{c1}$, based on a measurement $B_{r1}$ by a UE of a Cell-B carrier frequency in step 304C, and the load of Cell-B received in step 302. Calculated performance identifier $B_{c1}$ is compiled according to:

$$B_{c1} = f(B_{r1}, \text{load-Cell-}B).$$

The value range presented is an arbitrary chosen sorted range, showing the values that $B_{c1}$ may obtain.

The right column represents the corresponding values for the estimated performance $B_{p\text{-}est}$ in Cell-B. $B_{p\text{-}est}$ represents the performance as received recently as identifier $B_{p2}$ from RBS-B 120 based on measurement from a recent relocated UE 150, and the recent load in Cell-B.

As an example: a UE that measures a certain $B_{r1}$, may yield with the load in Cell-B a calculated performance $B_{c1}$ of an arbitrary value of 157. Mapping 304D of this value yields a $B_{p\text{-}est}$ of 55. If the UE is based on this $B_{p\text{-}est}$ selected to be relocated to Cell-B, it can occur that based on a measurement report in Cell-B and the actual load in Cell-B, RBS-B provides a perceived performance $B_{p2}$ back to RBS-A of 54, so a lower value than previously estimated. RBS-A will subsequently adapt the performance mapping table by adapting the $B_{p\text{-}est}$ for the line with the $B_{c1}$ entry for 157 from 55 to 54.

As one may note, the relation between both columns is not linear, and also does not have to be. The method presented allows any relation between both columns and additionally allows a dynamic behaviour.

Although this is a single table for the relation from Cell-A to Cell-B, one must realize that for each relation to a neighbour cell a separate table is created for load balancing to several target cells.

FIG. 4B is a table illustrating an embodiment of method steps of the improved load balancing action 300 focussing on execution of the UE selection for relocation 308, 308A.

The table applies arbitrary UE identifiers and values for the performances corresponding to FIG. 4A. The table shows a number of UEs 150, 152 having a unique identity (UE identifier) shown in the first column, that had reported measurement reports to the RBS-A 110. The second column shows the perceived performance $A_{p1}$ in Cell-A as calculated by RBS-A including the load in Cell-A. The third column shows the performance $B_{c1}$ as calculated by RBS-A for the Cell-B measurements by the UE connected to RBS-A, including the load in Cell-B.

The fourth column applies the mapping table of FIG. 4A to map the values of the calculated performance $B_1$ to an estimated performance $B_{p\text{-}est}$.

Just as an example the fifth column represents the Performance Gain, defined as a function Diff:$f(f(A_{p1}), f(B_{p\text{-}est}))$, in this case just as an arbitrary function of a simple subtraction of performance figures $B_{p\text{-}est} - A_{p1}$, although any suitable function could be deployed.

From this list a ranking, as deployed in step 308A could be made showing that the UE with identifier "B44" has the highest performance gain, and "532" has the lowest gain.

FIG. 4C is a table illustrating an embodiment of method steps of the improved load balancing action 300 focussing on another method of the execution of the UE selection for relocation 308, 308A.

Again the first column represents a UE identity. The second column represents a sequence number range with arbitrary sequence numbers, showing a certain time sequence in the measurements of relocated UEs.

For each UE measurement an estimated performance $B_{p\text{-}est}$ is derived from a $B_{c1}$ via the mapping table 400A and stored in this table 400C. The column with the Performance in Cell-A, $A_{p1}$ is not shown. Mapping is executed by means of a correction factor, shown in the fifth column. The correction factor is derived from a sliding window of e.g. the last four relocations, providing measurements deriving the estimated performance $B_{p\text{-}est}$ with the perceived performance after relocation $B_{p2}$. This correction factor is constantly changing as depicted in the fifth column, and regarded as a single correction factor for the UEs selected for relocation, thereby allowing a swift calculations and a limited storage area. The selection of UEs to be relocated is just as in FIG. 4B performed based on $B_{p\text{-}est}$ and $A_{p1}$ FIG. 5 is a signalling diagram illustrating an exchange of signals in an embodiment of the system, wherein the X2 signalling interface 136 is applied.

In FIG. 5 the signalling sequence 500 for a single UE selected for load balancing is illustrated. The UE 150 is connected to RBS-A 110 controlling Cell-A 122 on a first carrier frequency F1 and is instructed 502 to perform measurements on target frequency F2, applied in Cell-B 122, controlled by RBS-B 120.

The UE measures on F2 and detects the overlapping Cell-B. Then the UE reports 504 the radio link quality (RSRP/RSRQ) of Cell-B to the RBS-A.

The UE selection 506 for relocation is made by RBS-A. It is based on estimated performance or throughput in the source cell (Cell-A) compared to estimated performance or throughput in the target cell (Cell-B) based on the mapping table for Cell-B. This mapping table comprises a mapping from the reported radio link quality values (RSRP/RSRQ) to UE throughput, based on previous feedback values from Cell-B from other UEs that have performed IEF handover. X2 signalling relocation or handover is performed if the difference between the UE throughput in target and source cells, is within certain thresholds.

RBS-A submits 508 a relocation or Handover-request to RBS-B. RBS-B replies 510 with an acknowledge message, where after RBS-A submits 512 a radio Resource Control (RCC) Connection Reconfiguration towards UE 150.

When the UE has performed 514 the random access procedure it sends RRC Connection Reconfiguration Complete to the target eNodeB, i.e. RBS-B, meaning that the handover is successful and this will trigger RBS-B to send UE Context Release to the source RBS-B.

RBS-A additionally submits (not shown) an indication to RBS-B to respond with a perceived performance value measured by the one or more relocated UEs, after the relocation.

An identifier identifying the perceived performance 516 based on reported measurement in Cell-B is sent 518 along to RBS-A by RBS-B. RBS-A adapts its mapping table subsequently with the received new value for $B_{p\text{-}est}$.

Attached to- or Piggy-backed on the X2 UE Context release message are the UE based perceived performance parameters, indicated with an asterix (*) in the X2 signal table according to 3GPP TS 36.423 below. The IE type and reference have to be determined.

| IE/Group Name | Presence | Range | IE type and reference | Semantics description | Criticality | Assigned Criticality |
|---|---|---|---|---|---|---|
| Message Type | M | | 9.2.13 | | YES | ignore |
| Old eNodeB UE X2AP ID | M | | eNodeB UE X2AP ID 9.2.24 | Allocated at the source eNodeB | YES | reject |

-continued

| IE/Group Name | Presence | Range | IE type and reference | Semantics description | Criticality | Assigned Criticality |
|---|---|---|---|---|---|---|
| New eNodeB UE X2AP ID | M | | eNodeB UE X2AP ID 9.2.24 | Allocated at the target eNodeB | YES | reject |
| * New eNodeB UE perf. parameters | O | | t.b.d. | | | |

For the case that the X2 Private Message is sent (not shown in table above), after the UE Context has already been released, the X2 Private Message needs to contain $B_{p\text{-}est}$, but also the measurement quantities associated with it, in order to correctly update the mapping tables in RBS-A.

FIG. 6 is a signalling diagram illustrating an exchange of signals in an embodiment of the system, wherein the S1 signalling interface 116, 126 is applied.

In FIG. 6 the signalling sequence 600 for a single UE selected for load balancing is illustrated. The UE 150 is connected to RBS-A 110 controlling Cell-A 122 on a first carrier frequency F1 and is instructed 602 to perform measurements on target frequency F2, applied in Cell-B 122, controlled by RBS-B 120.

The UE measures on F2 and detects the overlapping Cell-B. Then the UE reports 604 the radio link quality (RSRP/RSRQ) of Cell-B to the RBS-A.

The UE selection 606 for relocation is made by RBS-A. It is based on estimated performance or throughput in the source cell (Cell-A) compared to estimated performance or throughput in the target cell (Cell-B) based on the mapping table for Cell-B. This mapping table comprises a mapping from the reported radio link quality values (RSRP/RSRQ) to UE throughput, based on previous feedback values from Cell-B from other UEs that have performed IEF handover. S1 signalling relocation or handover is performed if the difference between the UE throughput in target and source cells, is within certain thresholds.

RBS-A submits 608 a relocation or Handover to RBS-B required message to Mobility Management Entity (MME) 160. The MME signals 610 with a relocation or handover request (HO) to RBS-B and RBS-B replies 612 a HO-acknowledgement back to the MME.

The MME submits 614 a HO command to RBS-A, where after RBS-A submits 616 a radio Resource Control (RCC) Reconnection Reconfiguration towards UE 150.

RBS-A submits 618 a Status Transfer message to the MME.

When the UE has performed 620 the random access procedure it sends 624 a RRC Connection Reconfiguration Complete to the target eNodeB, i.e. RBS-B, meaning that the handover is successful. The MME submits 622 a Status Transfer message to the target RBS, RBS-B, and additionally submits an indication to RBS-B to respond with a perceived performance value measured by the one or more relocated UEs, after the relocation.

An identifier identifying the perceived performance 626 based on reported measurements in Cell-B is sent 628 along to the MME by RBS-B in a HO notify message.

The MME forwards the identifier identifying the perceived performance in Cell-B in a UE Context Release message to The RBS-A, that subsequently adapts its mapping table with the received new value for $B_{p\text{-}est}$. The MME will attach or submit in a piggy-back form the performance information to the UE in a Handover Notify message or Context Release message (described in section 8.3.3 in 3GPP TS 36.413).

This piggybacked information will be mapped between the messages by the MME, this requires a new function that is not supported by the MME today.

Piggybacked on the S1 UE Notify and Context release message are the UE based perceived performance parameters. See S1 signal tables according to 3GPP TS 36.413 below, where the performance info is indicated with an asterix (*). The IE type and reference have to be determined.

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME UE S1AP ID | M | | 9.2.3.3 | | YES | reject |
| eNodeB UE S1AP ID | M | | 9.2.3.4 | | YES | reject |
| E-UTRAN CGI | M | | 9.2.1.38 | | YES | ignore |
| TAI | M | | 9.2.3.16 | | YES | Ignore |
| * New eNodeB UE performance parameters | O | | t.b.d. | | | |

Handover Notify with UE performance parameters in neweNodeB piggy-backed.

| IE/Group Name | Presence | Range | IE type and reference | Semantics description | Criticality | Assigned Criticality |
|---|---|---|---|---|---|---|
| Message Type | M | | 9.2.1.1 | | YES | reject |
| CHOICE UE S1AP IDs | M | | | | YES | reject |
| >UE S1AP ID pair | M | | 9.2.3.18 | | | |
| >MME UE S1AP ID | M | | 9.2.3.3 | | | |
| Cause | M | | 9.2.1.3 | | YES | Ignore |
| * New eNodeB UE performance parameters | O | | t.b.d. | | | |

UE Context Release with UE performance parameters in new eNodeB piggy-backed.

Figure 7:
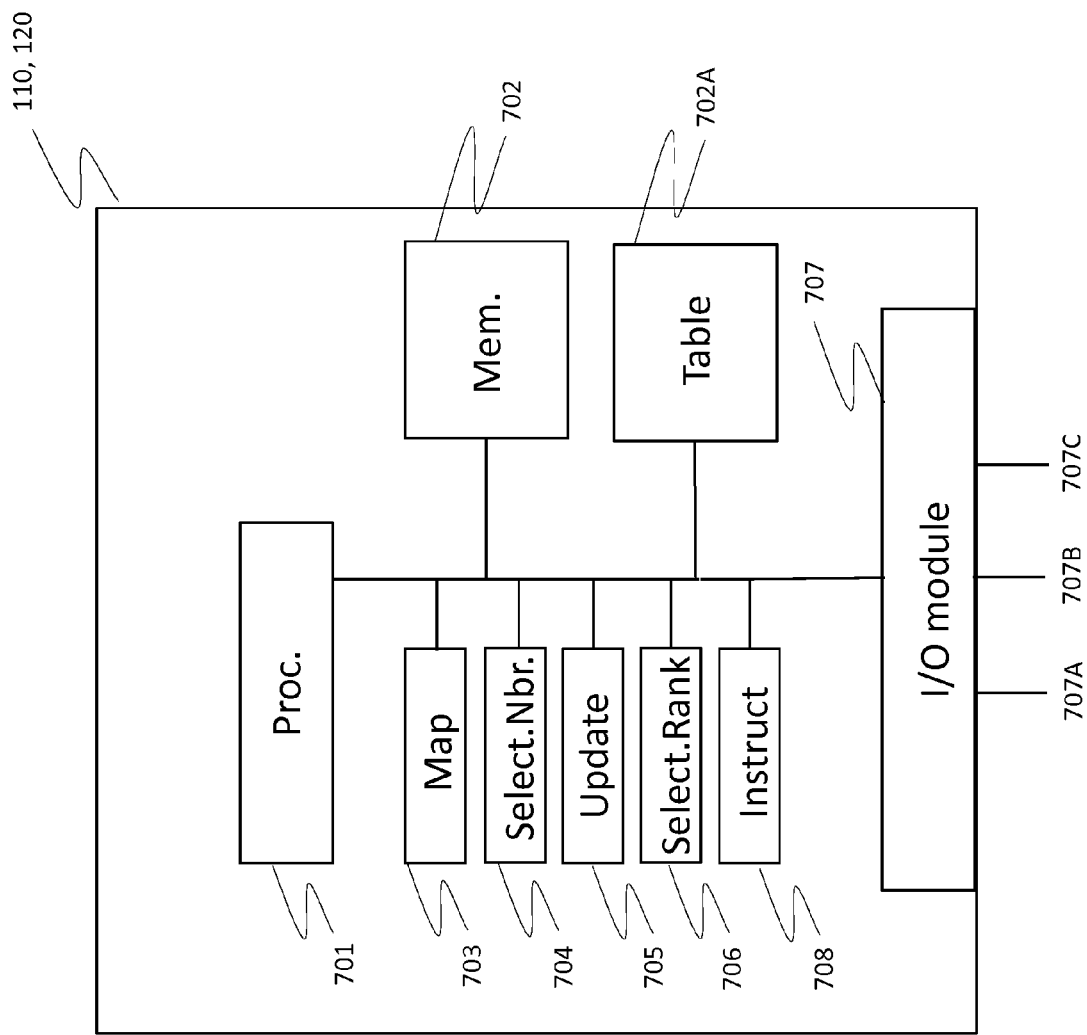
FIG. 7 is a block diagram illustrating an embodiment of a device.

FIG. 7 is a block diagram illustrating an embodiment of the Radio Base Station RBS-A 110, and RBS-B 120.

The RBS comprises:
 a processor module 701 arranged to process program instructions;
 a memory module 702 arranged to store the program instructions and network parameters;
 an interface module 707 arranged to connect to other network entities, the interface module depicted with three interfaces 707A, 707B and 707C arranged for a connection to S1 link 116, 126 and X2 link 136;
 a map module 703 arranged to map a measured performance and an estimated performance in an overlapping cell, the measured performance and the estimated performance comprised in a table 702A;
 a load balance decision 704 module arranged to decide a on a number of UEs to be relocated, the decision based on the mapped estimated performance and the measured performance in the overlapping cell;

an update 705 module arranged to update the table 702A with a received perceived performance in the overlapping cell, and wherein the processor module 701 is further arranged, under the program instructions, to control the interface module, the map module, the load balance decision module, and the update module.

The RBS further comprises a selection module 706 arranged to select the UEs to be relocated according to a ranked order wherein the UE's exceeding a first threshold are selected.

The RBS further comprises an instruct module 708, arranged to instruct the selected UEs to measure and report a performance signal of another RBS, RBS-B.

The Radio Base Station, RBS-A, RBS-B is an eNodeB, operating in the Long Term Evolution, LTE, network or a Voice over LTE, VoLTE network.

Figure 8:
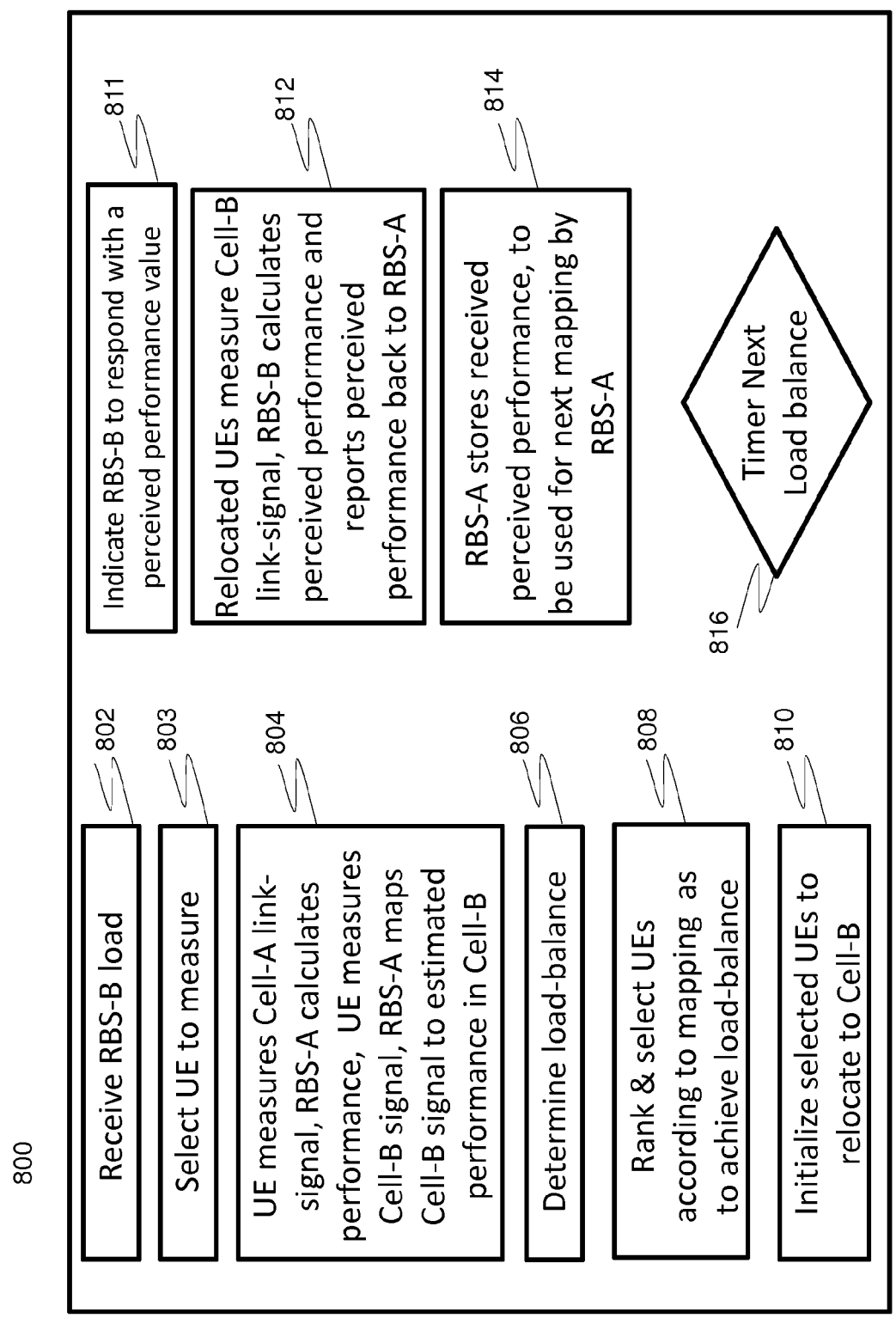
FIG. 8 is a block diagram illustrating an embodiment of a device

FIG. 8 is block diagram illustrating an embodiment of method steps in the E-UTRAN performing an improved load balancing action. The Module for executing the improved load balancing action comprises:

a receive module 802 for receiving the load of RBS-B;

select module 803 for selecting at least one of the served UEs for measuring and reporting a performance in Cell-A and a performance in Cell-B;

a calculator module 804 for calculating a performance in Cell-B, based on measurements made by a UE;

a map module 804 for mapping the calculated performance to an estimated performance in Cell-B;

a determination module 806 for determining the number of UE's to be relocated;

a rank and select module 808 for selecting UEs to be relocated for achieving a load balance;

an initialization module 810 for initialization of a relocation of the selected UEs from Cell-A to Cell-B;

a store module 814 for storing a received perceived performance in Cell-B of the relocated UEs from Cell-B, thereby updating the estimated performance value for Cell-B.

The UE performance or throughput measured in the target cell, Cell-B, while the UE is connected to RBS-A, is assumed to be a function of measured RSRP, RSRQ and actual load in Cell-B.

Optionally the UE throughput in Cell-B can also be calculated without the load indication of Cell-B.

Such as with the RSRP, RSRQ combined with other parameters, for example UE capabilities, that impact the throughput, such as carrier aggregation (CA).

A UE configured for CA has a Primary Cell (PCell), to which where the UE is connected and has established an RRC connection, as well as one or more Secondary Cells (SCells). The performance estimation for a CA capable UE is the sum of the performance or throughput for each cell utilized, i.e.:

Total performance=performance($P$Cell)+Σperformance($S$Cell)

In order to evaluate 304D the net performance gain from moving a CA capable UE between a source Cell-A and target Cell-B the method described is further improved by letting the CA aware measure and report RSRP/RSRQ not only on possible load balancing targets (PCells) but also on configured SCells.

Another alternative is to let the CA capability of the UE modify the mapping table created for each load balancing cell relation such that a CA capable and non-CA capable UE will see different relation between RSRP/RSRQ/load and possible throughput in target cell:

$B_{c1-ca}$: UE performance CellB(CA UE)=f1(RSRP, RSRQ, load)

$B_{C1-noca}$: UE performance CellB(non-CA UE)=f2(RSRP, RSRQ, load)

Where f1 and f2 are different functions.

The invention presented provides several advantages:

The mapping of the measurement results to a UE throughput performance prediction that facilitates a more accurate selection of UEs for subsequent relocations than in example load-balancing methods.

The feedback loop as proposed utilizes the possibility to send piggy-backed information on X2 UE Context Release or on X2 Private Message. For S1 the piggy-backed information is sent with Handover Notify and UE Context Release, regarded as optional features in existing networks.

The calculation of the ranked UE to be relocated allows a mapping of perceived measures signals of the Cell-B (when connected to RBS-A) and the estimated performance in Cell-B, with any suitable function.

RSRP measurements do not take the traffic load in a cell into account and the RSRQ measure is sensitive to traffic load, but not necessarily in proportion to the load balancing criteria. The method proposed prevents causing a distortion of UE distribution between the cells, by preventing improper relocation of UEs which could occur on even a small imbalance of the ranking criteria.

By application of the method presented only the UE's perceiving an improved performance gain are relocated, while the system performance as a whole is remained by a load balance action.

The invention claimed is:

1. A method for load balancing between cells in a communications network, said method involving a first radio base station, RBS-A, serving a first cell, Cell-A, which overlaps with a second cell, Cell-B, that is served by a second radio base station, RBS-B, said method comprising:

selecting by RBS-A at least one of the served UEs for measuring and reporting radio signal qualities for Cell-A and radio signal qualities for Cell-B;

measuring by one or more selected UEs present in the overlap, the radio signal qualities for Cell-A and the radio signal qualities for Cell-B, and reporting to RBS-A;

determining and selecting one or more UEs for relocation from Cell-A to Cell-B by RBS-A, based on the reported radio signal qualities and an estimated performance value for Cell-B for each of the one or more selected UEs present in the overlap, the estimated performance value for Cell-B for each of the one or more selected UEs present in the overlap being based on the radio signal qualities for Cell-B reported by the respective UE and on a performance mapping function for Cell-B, the performance mapping function for Cell-B in turn being based on perceived performance reports received from RBS-B for each of one or more UEs previously relocated to Cell-B;

initializing a relocation by RBS-A of the one or more selected UEs for relocation from Cell-A to Cell-B;

submitting an indication to RBS-B to respond with a perceived performance value for each of the one or more UEs for which relocation from Cell-A to Cell-B is initialized;

after relocation of the one or more UEs for which relocation from Cell-A to Cell-B is initialized, measuring, by the one or more UEs, radio signal qualities for Cell-B, and reporting to RBS-B;

calculating, by RBS-B, a perceived performance value for each of the one or more relocated UEs, based on the measured radio signal qualities reported by the one or more relocated UEs; and providing, by RBS-B to RBS-A, the calculated perceived performance values, for updating by RBS-A of the performance mapping function for Cell-B.

2. The method according to claim 1, wherein the step of determining and selecting the UEs for relocation from Cell-A to Cell-B comprises the further step of:

selecting the UEs for the relocation from Cell-A to Cell-B from a ranking of the UEs having the highest signal gain after relocation, up to a determined number of UEs to be relocated to achieve a load balance.

3. The method according to claim 1, wherein the step of determining and selecting the UEs for relocation from Cell-A to Cell-B further comprises that the estimated performance value for Cell-B for each of the one or more selected UEs present in the overlap is mapped from a value calculated according to a function of the load of Cell-B and the radio signal qualities for Cell-B reported by the respective UE.

4. The method according to claim 1, wherein the method is performed in response to the RBS-A detecting that the requested capacity for Cell-A has increased to a preconfigured value in relation the available capacity of Cell-A.

5. A method in a first Radio Base Station, RBS-A, for load balancing between cells in a communications network, the network comprising a first cell, Cell-A, controlled by RBS-A and a second cell, Cell-B, controlled by a second Radio Base Station, RBS-B, both cells at least partly overlapping, RBS-A serving at least one User Equipment, UE, RBS-A and RBS-B communicatively connected via a link, the method comprising the steps of:

selecting at least one of the served UEs for measuring and reporting radio signal qualities for Cell-A and radio signal qualities for Cell-B;

receiving the reported radio signal qualities for Cell-A and Cell-B;

determining and selecting one or more UEs for relocation from Cell-A to Cell-B, based on the reported radio signal qualities and an estimated performance value for Cell-B for each of the one or more selected UEs present in the overlap, the estimated performance value for Cell-B for each of the one or more selected UEs present in the overlap being based on the radio signal qualities for Cell-B reported by the respective UE and on a performance mapping function for Cell-B, the performance mapping function for Cell-B in turn being based on perceived performance reports received from RBS-B for each of one or UEs previously relocated to Cell B;

initializing a relocation of the one or more selected UEs for relocation from Cell-A to Cell-B;

submitting an indication to RBS-B to respond with a perceived performance value for each of the one or more UEs for which relocation from Cell-A to Cell-B is initialized;

receiving, from RBS-B, a calculated perceived performance value for each of the one or more UEs for which relocation from Cell-A to Cell-B is initialized; and updating the performance mapping function for Cell-B, based on the calculated perceived performance values received from RBS-B.

6. The method according to claim 5, wherein the step of determining and selecting the UEs for relocation from Cell-A to Cell-B comprises the further step of:

selecting the UEs for the relocation from Cell-A to Cell-B from a ranking of the UEs having the highest signal gain after relocation, up to a determined number of UEs to be relocated to achieve a load balance.

7. The method according to claim 5, wherein the step of determining and selecting the UEs for relocation from Cell-A to Cell-B further comprises that the estimated performance value for Cell-B for each of the one or more selected UEs present in the overlap is mapped from a value calculated according to a function of the load of Cell-B and the radio signal qualities for Cell-B reported by the respective UE.

8. The method according to claim 5, wherein the method is performed in response to the RBS-A detecting that the requested capacity for Cell-A has increased to a preconfigured value in relation the available capacity of Cell-A.

9. The method according to claim 5, wherein the step of determining and selecting the UEs for relocation from Cell-A to Cell-B further comprises the step of:

determining a number of UEs that are to be transferred to Cell-B, based on the load of Cell-A and the load of Cell-B.

10. The method according to claim 9, wherein the selection of the one or more UEs to be relocated from Cell-A to Cell-B is performed up to the determined number of UEs that are to be transferred to Cell-B.

11. A method in a second Radio Base Station, RBS-B, for load balancing between cells in a communications network, the network comprising a first cell, Cell-A, controlled by a first Radio Base Station, RBS-A, and a second cell, Cell-B, controlled by RBS-B, both cells at least partly overlapping, RBS-A having served and relocated at least one User Equipment, UE, the relocation based on an estimated performance value for Cell-B for each relocated UE, as determined by RBS-A, RBS-A and RBS-B being communicatively connected via a link, said method comprising the steps of:

receiving an indication from RBS-A to respond with a perceived performance value for each of the one or more relocated UEs;

receiving, for each of the one or more relocated UEs, a report of measured radio signal qualities in Cell-B;

calculating, by RBS-B, a perceived performance value for each of the one or more relocated UEs, based on the measured radio signal qualities reported by the one or more relocated UEs; and providing, to RBS-A, the calculated perceived performance values for each of the one or more relocated UE, for use by RBS-A in updating a performance mapping function for Cell-B.

12. The method according to claim 5, wherein the network is a Long Term Evolution, LTE, network and the RBS-B is an eNodeB.

13. A system arranged for load balancing between cells in a communications network, the network comprising a first Radio Base Station, RBS-A, serving a first cell, Cell-A, and a second Radio Base Station, RBS-B, serving a second cell, Cell-B, both cells at least partly overlapping, the RBS-A serving at least one User Equipment, UE, RBS-A and RBS-B communicatively connected via a link, wherein:

the RBS-A is arranged to select at least one of the served UEs to measure and report radio signal qualities for Cell-A and radio signal qualities for Cell-B;

one or more selected UEs present in the overlap are arranged to measure the radio signal qualities for Cell-A and the radio signal qualities for Cell-B, and to report the radio signal qualities to RBS-A;

the RBS-A is arranged to determine and select one or more UEs to be relocated from Cell-A to Cell-B, based on the reported radio signal qualities and an estimated performance value for Cell-B for each of the one or more selected UEs present in the overlap, the estimated performance value for Cell-B for each of the one or more selected UEs present in the overlap being based on the radio signal qualities for Cell-B reported by the respective UE and on a performance mapping function for Cell-B, the performance mapping function for Cell-B in turn being based on perceived performance reports received from RBS-B for each of one or UEs previously relocated to Cell-B;

the RBS-A is arranged to initialize a relocation by of the one or more selected UEs for relocation from Cell-A to Cell-B;

the one or more relocated UEs are arranged to measure radio signal qualities in Cell-B, after relocation, and to report the radio signal qualities in Cell-B to RBS-B; and the RBS-B is arranged to calculate a perceived performance value for each of the one or more relocated UEs, based on the measured radio signal qualities reported by the one or more relocated UEs, and to provide, to RBS-A, the calculated perceived performance values, for an update by RBS-A of the performance mapping function for Cell-B.

14. A first Radio Base Station, RBS-A, for use in a cellular communication network system, the RBS-A arranged for a load balance action between cells in the communications network, the RBS-A comprising:

interface circuitry configured to communicatively connect to other network entities; and processing circuitry associated with the interface circuitry and configured to:

calculate a performance value for each of a plurality of user equipments, UEs, based on radio signal qualities for an overlapping cell measured and reported by the plurality of UEs;

map the calculated performance value for each of the plurality of UEs to an estimated performance value for the overlapping cell, for the respective UE, the measured performance and the estimated performance comprised in based on a table mapping calculated values to perceived performance values for the overlapping cell, the perceived performance values having been previously received for each of one or more UEs previously relocated to the overlapping cell;

select and decide on a number of UEs to be relocated, the decision based on the mapped estimated performance values; and update the table with a subsequently received perceived performance value in the overlapping cell for one or more of UEs selected to be relocated.

15. The Radio Base Station, RBS-A according to claim 14, wherein the processing circuitry is configured to select the UEs to be located according to a ranked order, wherein UEs exceeding a first threshold are selected.

16. The Radio Base Station, RBS-A according to claim 15, wherein the processing circuitry is configured to instruct the one or more selected UEs to measure and report a performance signal of another RBS, RBS-B, and to initialize a relocation for the UEs selected to be relocated.

17. The Radio Base Station, RBS-A, according to claim 14, wherein the communication network system is a Long Term Evolution, LTE, network or a Voice over LTE, VoLTE network, and wherein the RBS-A is an evolved Node B (eNodeB).

18. A second Radio Base Station, RBS-B, for use in a cellular communication network system, the RBS-B arranged for a load balance action between cells in the communications network, RBS-B controlling a second cell, Cell-B, the RBS-B arranged to cooperate in a load balance action with a first radio Base Station, RBS-A, wherein the load balance action is performed by a selection of UEs to be relocated based on an estimated performance in the Cell-B, the RBS-B comprising:

interface circuitry configured to communicatively connect to other network entities;

processing circuitry associated with the interface circuitry and configured to:

instruct a relocated UE to measure and report radio signal qualities in Cell-B, wherein the relocated UE was relocated from another cell to the Cell-B according to a load balance action initialized by the RBS-A;

calculate a perceived performance value for the relocated, based on the measured radio signal qualities reported by the relocated UE; and transmit a value based on the calculated perceived performance value for the relocated UE, to RBS-A, for updating an a performance mapping function for Cell-B.

19. The Radio Base Station, RBS-B, according to the claim 18, wherein the communication network system is a Long Term Evolution, LTE, network or a Voice over LTE, VoLTE network, and wherein the RBS-B is an evolved Node B (eNodeB).

20. A non-transitory computer-readable medium storing a computer program comprising computer program instructions, which, when executed by processing circuitry in a first Radio Base Station, RBS-A, adapt the RBS-A to control load balancing in a communications network, the network comprising a first cell, Cell-A, controlled by the RBS-A and a second cell, Cell-B, controlled by a second Radio Base Station, RBS-B, where both cells are at least partly overlapping, RBS-A serves at least one User Equipment, UE, RBS-A and RBS-B is communicatively connected via a link, said computer program instructions configuring the RBS-A to:

select at least one of the served UEs for measuring and reporting radio signal qualities for Cell-A and radio signal qualities for Cell-B;

receive the reported radio signal qualities for Cell-A and Cell-B;

determine and select one or more UEs for relocation from Cell-A to Cell-B, based on the reported radio signal qualities and an estimated performance value for Cell-B for each of one or more selected UEs present in the overlap, the estimated performance value for Cell-B for each of the one or more selected UEs present in the overlap being based on the radio signal qualities for Cell-B reported by the respective UE and on a performance mapping function for Cell-B, the performance mapping function for Cell-B in turn being based on perceived performance reports received from RBS-B for each of one or UEs previously relocated to Cell B;

initialize a relocation of the one or more selected UEs for relocation from Cell-A to Cell-B;

submit an indication to RBS-B to respond with a perceived performance value for each of the one or more UEs for which relocation from Cell-A to Cell-B is initialized;

receive, from RBS-B, a calculated perceived performance value for each of the one or more UEs for which relocation from Cell-A to Cell-B is initialized; and update the performance mapping function for Cell-B, based on the calculated perceived performance values received from RBS-B.

21. The non-transitory computer-readable medium according to claim 20, wherein the computer program instructions include instructions configuring the RBS-A to determine the UEs for relocation from Cell-A to Cell-B by selecting the UEs to be relocated from Cell-A to Cell-B from a ranking of the UEs having the highest signal gain after relocation, up to a determined number of UEs to be relocated to achieve a load balance.

22. The non-transitory computer-readable medium according to claim 20, wherein the computer program instructions includes instructions configuring the RBS-A to determine the UEs for relocation from Cell-A to Cell-B further by deriving mapping the estimated performance value for each of the one or more selected UEs present in the overlap from a value calculated according to a function of the load of Cell-B and the radio signal qualities for Cell-B reported by the respective UE.

23. The non-transitory computer-readable medium according to claim 20, wherein the computer program instructions include instructions to configure the RBS-A to carry out the steps set forth in claim 20 in response to detecting that that the requested capacity for Cell-A increases to a preconfigured value in relation the available capacity of Cell A.

24. A first Radio Base Station, RBS-A, the RBS-A performing a load balance action in a communications network, the network comprising a first cell, Cell-A, controlled by RBS-A and a second cell, Cell-B, controlled by a second Radio Base Station, RBS-B, both cells at least partly overlapping, RBS-A serving at least one User Equipment, UE, RBS-A and RBS-B communicatively connected via a link, wherein RBS-A comprises:

receiver circuitry configured to receive an indication of the load of RBS-B; and processing circuitry configured to:
    select at least one of the served UEs for measuring and reporting radio signal qualities for Cell-A and radio signal qualities for Cell-B;
    calculate a performance in Cell-B for each of one more UEs, based on measurements of the radio signal qualities for Cell-B made by the respective UE;
    map the calculated performance to an estimated performance in Cell-B, for each of the one or more UEs;
    determine the number of UEs for a relocation, based on the estimated performances, the estimated performance values being based on the radio signal qualities for Cell-B measured by the one or more UEs and on a performance mapping function for Cell-B, the performance mapping function for Cell-B in turn being based on perceived performance reports received from RBS-B for each of one or more UEs previously relocated to Cell-B;
    rank and select UEs to be relocated for achieving a load balance;
    initialize a relocation of the selected UEs from Cell-A to Cell-B;
    indicate to RBS-B to respond with perceived performance values for Cell-B for each of the one or more relocated UEs; and
    store the perceived performance values as received from the RBS-B, thereby updating the performance mapping function for Cell-B.

* * * * *

UNITED STATES PATENT AND TRADEMARK OFFICE
CERTIFICATE OF CORRECTION

PATENT NO. : 9,820,188 B2
APPLICATION NO. : 14/407488
DATED : November 14, 2017
INVENTOR(S) : Ekemark et al.

It is certified that error appears in the above-identified patent and that said Letters Patent is hereby corrected as shown below:

On the Title Page

In Item (72), under "Inventors", in Column 1, Line 1, delete "Sven Ekemark, Storveta" and insert -- Sven Harald Ekemark, Storvreta --, therefor.

In the Specification

In Column 2, Line 22, delete "and or" and insert -- and/or --, therefor.

In Column 6, Line 61, delete "$A_{r1}$" and insert -- $A_{r1}$, --, therefor.

In Column 9, Line 4, delete "UE's" and insert -- UEs --, therefor.

In Column 9, Line 31, delete "RBS-B's the" and insert -- RBS-B's --, therefor.

In Column 10, Line 64, delete "RNS-A" and insert -- RBS-A --, therefor.

In Column 11, Line 43, delete "(UMTS)" and insert -- system (UMTS) --, therefor.

In Column 12, Line 55, delete "UE's" and insert -- UEs --, therefor.

In Column 12, Line 66, delete "Cell-B 120," and insert -- Cell-B 122, --, therefor.

In Column 14, Line 2, delete "UE's" and insert -- UEs --, therefor.

In Column 15, Line 56, delete "UE's" and insert -- UEs --, therefor.

In Column 16, Line 27, delete "UE's" and insert -- UEs --, therefor.

Signed and Sealed this
Third Day of April, 2018

Andrei Iancu
*Director of the United States Patent and Trademark Office*

CERTIFICATE OF CORRECTION (continued)
U.S. Pat. No. 9,820,188 B2

In Column 21, Line 10, delete "UE's" and insert -- UEs --, therefor.

In Column 21, Line 32, delete "UE's" and insert -- UEs --, therefor.

In Column 22, Line 30, delete "UE's" and insert -- UEs --, therefor.

In the Claims

In Column 23, Line 55, in Claim 5, delete "Cell B;" and insert -- Cell-B; --, therefor.

In Column 26, Line 65, in Claim 20, delete "Cell B;" and insert -- Cell-B; --, therefor.

In Column 27, Line 34, in Claim 23, delete "Cell A." and insert -- Cell-A. --, therefor.